US008148838B2

(12) United States Patent
Ferguson

(10) Patent No.: US 8,148,838 B2
(45) Date of Patent: Apr. 3, 2012

(54) SYSTEMS AND METHODS FOR TETHERED WIND TURBINES

(75) Inventor: Frederick D. Ferguson, Ontario (CA)

(73) Assignee: Magenn Power, Inc., Kanata, Ontario ( * ) Notice: Subject to any disclaimer, the term of this patent is extended or adjusted under 35 U.S.C. 154(b) by 0 days.

(21) Appl. No.: 12/947,213

(22) Filed: Nov. 16, 2010

(65) Prior Publication Data

US 2011/0121578 A1    May 26, 2011

Related U.S. Application Data

(60) Division of application No. 12/557,203, filed on Sep. 10, 2009, now Pat. No. 7,859,126, which is a division of application No. 12/173,420, filed on Jul. 15, 2008, now Pat. No. 7,602,077, which is a continuation-in-part of application No. 12/019,872, filed on Jan. 25, 2008, now Pat. No. 7,775,761, which is a continuation of application No. 11/120,807, filed on May 3, 2005, now Pat. No. 7,335,000.

(51) Int. Cl.
    *F03D 3/00* (2006.01)
(52) U.S. Cl. ............................................ 290/44; 290/55
(58) Field of Classification Search .................... 290/43, 290/44, 54, 55; 416/4, 84
    See application file for complete search history.

(56) References Cited

U.S. PATENT DOCUMENTS

| 1,835,018 A | 12/1931 | Darrieus |
| D169,290 S | 4/1953 | Sneed |
| 2,835,462 A | 5/1958 | Martin |
| 3,026,073 A | 3/1962 | Albertson, Jr. |
| 3,087,698 A | 4/1963 | Mullinix |
| 3,107,888 A | 10/1963 | Finn |
| 3,255,985 A | 6/1966 | Albertson, Jr. |
| 3,526,377 A | 9/1970 | Flatau |
| 3,997,136 A | 12/1976 | Finn et al. |
| 4,073,516 A | 2/1978 | Kling |
| 4,078,746 A | 3/1978 | Harris |
| 4,084,102 A | 4/1978 | Fry et al. |
| 4,166,596 A | 9/1979 | Mouton, Jr. et al. |
| 4,207,026 A | 6/1980 | Kushto |
| 4,243,190 A | 1/1981 | Sams |
| 4,285,481 A | 8/1981 | Biscomb |
| 4,350,896 A | 9/1982 | Benoit |
| 4,350,899 A | 9/1982 | Benoit |
| 4,366,936 A | 1/1983 | Ferguson |

(Continued)

OTHER PUBLICATIONS

"Circulation and the Magnus effect", Vittorio Celli, 1997, http://landau1.phys.virginia.edu/classes/311/notes/aero/node2.html. 2pgs.

(Continued)

*Primary Examiner* — Nicholas Ponomarenko
(74) *Attorney, Agent, or Firm* — Buckley, Maschoff & Talwalkar LLC

(57) ABSTRACT

According to some embodiments, a plurality of airborne bodies may each extend horizontally along an axis between a first point and a second point. Each body may be, for example, at least partially filled with a gas and two or more vanes may be provided airborne with each body such that the vanes, when acted upon by a wind force perpendicular to the axis, are operable to cause rotation about the axis. Moreover, one or more electrical generators may be airborne with each body to convert rotational energy produced by the rotation about the axis into electrical energy.

20 Claims, 20 Drawing Sheets

U.S. PATENT DOCUMENTS

| | | |
|---|---|---|
| 4,366,939 A | 1/1983 | McMillan |
| 4,450,364 A | 5/1984 | Benoit |
| 4,470,563 A | 9/1984 | Engelsman |
| 4,486,669 A | 12/1984 | Pugh |
| 4,491,739 A | 1/1985 | Watson |
| 4,659,940 A | 4/1987 | Shepard |
| 4,779,825 A | 10/1988 | Sams |
| 4,790,498 A | 12/1988 | Jeffrey |
| 4,942,506 A | 7/1990 | Flory |
| 5,269,647 A | 12/1993 | Moser |
| 5,645,248 A | 7/1997 | Campbell |
| 5,954,297 A | 9/1999 | Bukur |
| 6,072,245 A | 6/2000 | Ockels |
| 6,327,994 B1 | 12/2001 | Labrador |
| 6,373,424 B1 | 4/2002 | Soenen |
| 6,420,796 B1 | 7/2002 | Lagerwey |
| 6,425,552 B1 | 7/2002 | Lee et al. |
| 6,616,402 B2 | 9/2003 | Selsam |
| 6,781,254 B2 | 8/2004 | Roberts |
| 7,129,596 B2 | 10/2006 | Macedo |
| 7,335,000 B2 * | 2/2008 | Ferguson ............... 417/7 |
| 7,582,981 B1 | 9/2009 | Meller |
| 7,602,077 B2 * | 10/2009 | Ferguson ............ 290/55 |
| 7,775,761 B2 * | 8/2010 | Ferguson ............... 415/7 |
| 7,859,126 B2 * | 12/2010 | Ferguson ............ 290/44 |
| 2008/0181773 A1 | 7/2008 | Ferguson |

OTHER PUBLICATIONS

"Aanaeay ianoaoneay—Ciae laaiona", download Sep. 13, 2007. Retrieved from Internet: URL: Http://igrushka.kz/ivp10/zmmagnus.html. 5pgs.

"PCT International Search Report of the International Searching Authority, or the Declaration", mailed Feb. 14, 2006, for PCT/IB2005/002996, 4pgs.

* cited by examiner

SYSTEMS AND METHODS FOR TETHERED WIND TURBINES

RELATED APPLICATIONS

This is a divisional application of co-pending U.S. patent application Ser. No. 12/557,203 filed Sep. 10, 2009, which is a divisional application of U.S. patent application Ser. No. 12/173,420 filed Jul. 15, 2008 (issued as U.S. Pat. No. 7,602,077), which was a continuation-in-part of U.S. patent application Ser. No. 12/019,872 filed Jan. 25, 2008 (issued as U.S. Pat. No. 7,775,761), which was a continuation of prior U.S. patent application Ser. No. 11/120,807 filed May 3, 2005 (issued as U.S. Pat. No. 7,335,000). The entire contents of those applications are incorporated herein by reference.

TECHNICAL FIELD

The present disclosure relates generally to systems and methods for providing electrical energy generation via wind power, and more particularly to systems and methods for tethered wind turbines.

BACKGROUND

The use of renewable energy resources continues to be an important factor in satisfying energy demands while substantially reducing environmental impacts. Solar, hydropower, and wind resource technologies, for example, continue to decrease in cost and increase in efficiency, while practically eliminating adverse environmental effects. Many conventional renewable recourse energy generation technologies, however, require large amounts of capital and/or real estate to implement. With respect to wind generation facilities, for example, typical windmill style, tower-mounted rotors may be expensive to build and/or may be required to be sited on large parcels of land having extensive wind resources.

Other forms of wind generation systems have employed wind turbines held aloft by buoyant gas balloons and/or kites. Theses systems may, for example, take advantage of more prevalent and/or consistent wind resources located at altitudes not realizable by most tower-mounted structures. Even these types of systems, however, may be unwieldy, expensive, and/or not practicable in certain applications. For these and other reasons, typical wind resource electrical generation systems may be undesirable.

Accordingly, there is a need for systems and methods for tethered wind turbines that address these and other problems found in existing technologies.

DETAILED DESCRIPTION

According to some embodiments, systems and methods for tethered wind turbines are provided. Tethered wind turbines that rotate about a horizontal axis in response to a normal wind force may, for example, be utilized to produce electrical energy. In some embodiments, the tethered wind turbines are filled, pressurized, and/or super-pressurized with a gas. The gas may comprise, for example, a lifting gas that is operable to facilitate the deployment of the turbines. According to some embodiments, the turbines are held aloft, at least in part, by the Magnus effect and/or other lifting effects. In some embodiments, the turbines may be primarily held aloft and/or lifted by, for example, the Magnus effect. Such turbines may, for example, be relatively inexpensive, easily deployable and/or manageable, and/or may otherwise provide advantages over previous systems. According to some embodiments, small tethered wind turbines are deployed in emergency, as-needed, and/or mobile applications (e.g., a backpack version deployed by a hiker or motorist). In some embodiments, much larger turbines (e.g., from about one hundred to three hundred meters in length, or more) may be deployed.

Figure 1A:
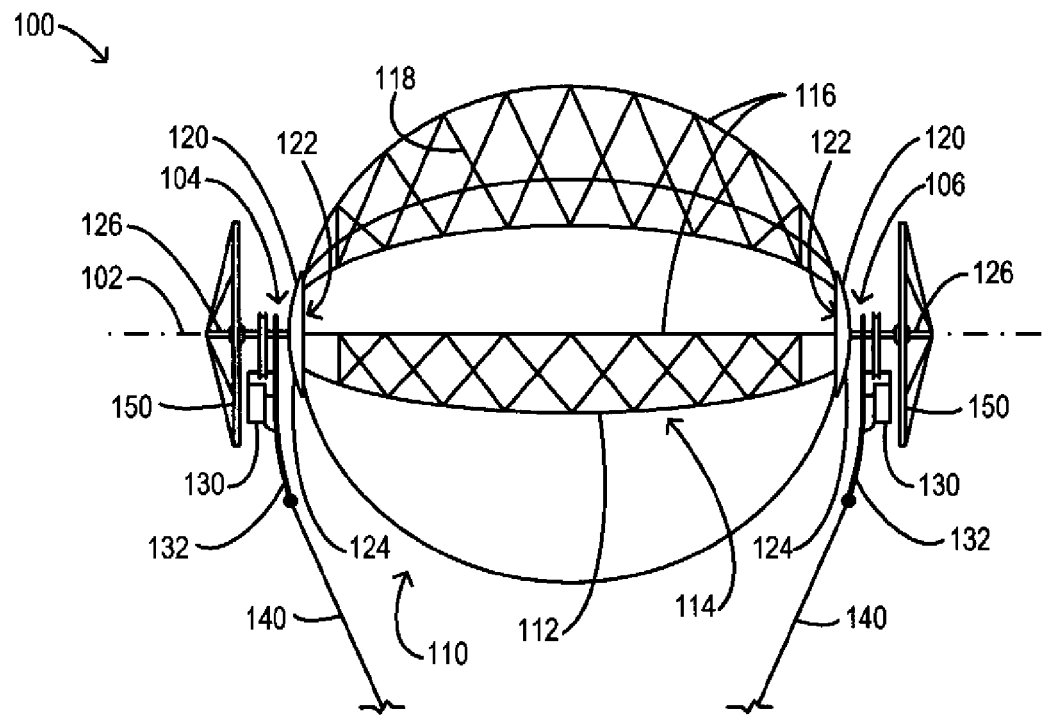
FIG. 1A and FIG. 1B are block diagrams of a system according to some embodiments.
Figure 1B:
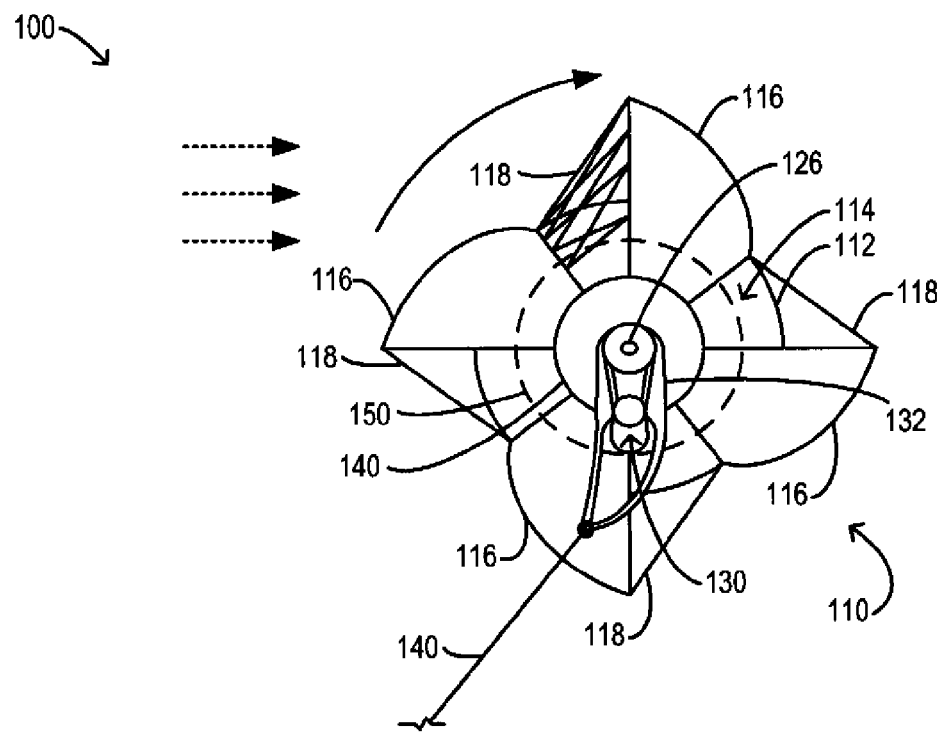

Referring first to FIG. 1A and FIG. 1B, block diagrams of a system 100 according to some embodiments are shown. In some embodiments, FIG. 1A shows a frontal view of the system 100, while FIG. 1B shows an end or side view of the system 100. The various systems described herein are depicted for use in explanation, but not limitation, of described embodiments. Different types, layouts, quantities, and configurations of any of the systems described herein may be used without deviating from the scope of some embodiments. Fewer or more components than are shown in relation to the systems described herein may be utilized without deviating from some embodiments.

The system 100 may comprise, for example, a substantially horizontal axis 102, a first point 104 situated on the axis 102, and/or a second point 106 situated on the axis 102. In some embodiments, the system comprises a tethered wind turbine 110. The tethered wind turbine 110 may, for example, comprise a body 112 extending substantially between the first and second points 104, 106. The body 112 may, for example, be an airborne body. According to some embodiments, the body 112 may define an envelope 114 that may, for example, be pressurized with a gas. The tethered wind turbine 110 may also or alternatively comprise, in some embodiments, one or more vanes 116 coupled to the body 112. The vanes 116 may, for example, be operable to be acted upon by a wind force and/or other air flow (e.g., as indicated by the three horizontal dotted lines in FIG. 1B) to cause the body 112 (and/or the envelope 114) to rotate about the axis 102.

According to some embodiments, the vanes 116 are positioned, shaped, and/or otherwise acted upon by one or more supports 118. The supports 118 may, for example, facilitate the shaping of the vanes 116 to be operable to be acted upon by the wind force (e.g., to form a concave surface, as shown in FIG. 1A and FIG. 1B, upon which the wind force may act). In FIG. 1B, the depiction of the supports 118 is simplified solely to reduce clutter. In some embodiments, the body 112 and/or the envelope 114 may extend horizontally between two end plates 120. The two endplates 120 may, for example, comprise an inner surface 122 coupled to the body 112 and/or to the envelope 114 and/or an outer surface 124 comprising a projection 126. In some embodiments, the projections 126 are axles substantially aligned with the horizontal axis 102. According to some embodiments, one or more generators 130 are coupled to convert rotational energy (e.g., from the rotation of the body 112, envelope 114, and/or projections 126 about the axis 102) into electrical energy. The generators 130 may, for example, be mechanically coupled to the projections 126 and are suspended (e.g., via gravity) there from.

In some embodiments, the generators 130 may also or alternatively be coupled to one or more yokes 132. The yokes 132 may, for example, comprise bushings, bearings (e.g., ball bearings), and/or other devices (not shown) that are operable to facilitate and/or allow the body 112 and/or the projections 126 to rotate about the axis 102, while positioning the generators 120 to be operable to receive rotational energy from the rotating body 112 and/or projections 126. In some embodiments, the yokes 132 are rotationally coupled to the projections 126 at and/or near the first and second points 104, 106 on the axis 102. According to some embodiments, the yokes 132 may also or alternatively be parts and/or portions of the generators 130. The yokes 132 may, for example, comprise one or more flanges, projections, couplings, and/or other objects associated with and/or attached to the generators 130.

According to some embodiments, the yokes 132 may also or alternatively be coupled to one or more tethers 140. The tethers 140 may, in some embodiments, be coupled to the body 112, the projections 126, and/or the generators 130. The tethers 140 may, for example, couple the body 112 to a third point (not shown in FIG. 1A or FIG. 1B) such as a ground station. In some embodiments, the tethers 140 may comprise any number of ropes, cables, wires, and/or other connective devices that are or become known or practicable. According to some embodiments, the tethers 140 are operable to couple the wind turbine 110 to the third point and/or to transfer electrical energy from the generators 130 toward the third point (e.g., toward the ground).

In some embodiments, the wind turbine 110 may also or alternatively comprise one or more stabilizers 150. The stabilizers 150 may, for example, be substantially disk-shaped devices coupled to the projections 126 (e.g., as shown in FIG. 1A). According to some embodiments, the stabilizers 150 may facilitate orientation of the wind turbine 110 (e.g., with respect to the axis 102) perpendicularly to the prevailing wind force. The stabilizers 150 may, for example, allow the wind turbine 110 to be self-positioning and/or to automatically re-position as prevailing wind forces change direction. In such a manner, for example, the vanes 116 may generally be positioned such that the prevailing wind force acts upon the frontal (e.g., windward) surfaces of the vanes 116 to cause the body 112 to rotate (e.g., in a clock-wise and/or backwards direction, as shown in FIG. 1B) about the horizontal axis 102. In FIG. 1B, the stabilizer 150 is shown in phantom to increase visibility of components (e.g., the generator 130 and/or yoke 132) that may otherwise be obscured.

This cross-flow of the wind force across the wind turbine 110 (and/or the clock-wise and/or backward direction of rotation), according to some embodiments, facilitates the lifting of the wind turbine 110. Even if the envelope 114 is filled and/or pressurized with a gas that is not lighter than air (e.g., air itself), for example, the Magnus effect associated with the rotation of the body 112 about the axis 102 will supply a lift force to the wind turbine 110. In some embodiments, this Magnus effect lift force is substantial enough to provide all of the lift necessary to allow the wind turbine 110 to be deployed and/or remain aloft. According to some embodiments, other lift forces (e.g., such as that generated by use of a lighter-than-air and/or lifting-gas to pressurize the envelope 114) may also or alternatively facilitate the deployment of the wind turbine 110.

In some embodiments, the body 112 of the wind turbine 110 is comprised of one or more flexible materials. The body 112 may, for example, be inflatable and/or collapsible. According to some embodiments, such as in the case that the wind turbine 110 is constructed in accordance with smaller dimensions (e.g., ten to thirty feet in length), the body 112 are comprised of one or more lightweight and/or low-permeability (e.g., with respect to light-weight gases) materials. The body 112 may comprise, for example, a coated and/or laminated Dacron®. In some embodiments, such as in the case that the wind turbine 110 is constructed in accordance with larger dimensions (e.g., one hundred to four hundred feet in length), the body 112 are comprised of one or more layers of lightweight, high-tenacity, and/or high-strength materials. The body 112 may comprise, for example, an inner surface of to facilitate retention of lighter-than-air gases such as hydrogen and/or helium (e.g., Mylar®), a structurally-woven core (e.g., including Dacron®, Vectran®, Spectra®, and/or Kevlar®), and/or an outer coating to provide Ultra-Violet (UV) and/or abrasion protection (e.g., Tedlar®). In some embodiments, strapping, cables, and/or other structural members (such as the tri-axial strapping described elsewhere herein) are incorporated into the structural core layer and/or coated with the exterior and/or final coating (such as Tedlar®).

According to some embodiments, the vanes 116 may also or alternatively be comprised of one or more flexible materials. In the case that the vanes 116 are comprised of a flexible material, the supports 118 and/or other devices are utilized to provide, define, and/or maintain the shape of the vanes 116. The supports 118 may comprise, for example, one or more rigid and/or semi-rigid struts, tension members, and/or other structural supports to facilitate the positioning and/or shaping of the vanes 116. In some embodiments, other structural members (such as struts or cables) may also or alternatively reside within the vanes 116 to provide structural capabilities. According to some embodiments, the vanes 116 themselves are comprised of rigid, semi-rigid, and/or lightweight materials (e.g., fiberglass and/or composite resins).

In some embodiments, the wind turbine 110 may comprise various numbers, types, and/or configurations of vanes 116. As shown in FIG. 1A and FIG. 1B, for example, the wind turbine 110 may comprise four vanes 116 distributed substantially evenly about the circumference of the body 112. The vanes 116 may also or alternatively (e.g., as shown) extend substantially along the length of the body 112 (e.g., from at or near the first point 104 to at or near the second point 106). In some embodiments, the wind turbine 110 may comprise fewer (e.g., two or three) or more (e.g., five or more) vanes 116. According to some embodiments, the vanes 116 may extend only partially along the length of and/or along portions of the body 112.

In some embodiments, the body 112 of the wind turbine 110 may comprise a substantially spherical shape as shown in FIG. 1A and FIG. 1B. In other words, the ratio of the length to the diameter of the body 112 may be substantially one to one. According to some embodiments, the body 112 may otherwise be shaped. The body 112 may, for example, be configured to have length to diameter ratios of up to about three to one. Other shapes, ratios, and/or configurations of the wind turbine 110 are described elsewhere herein.

Figure 2A:
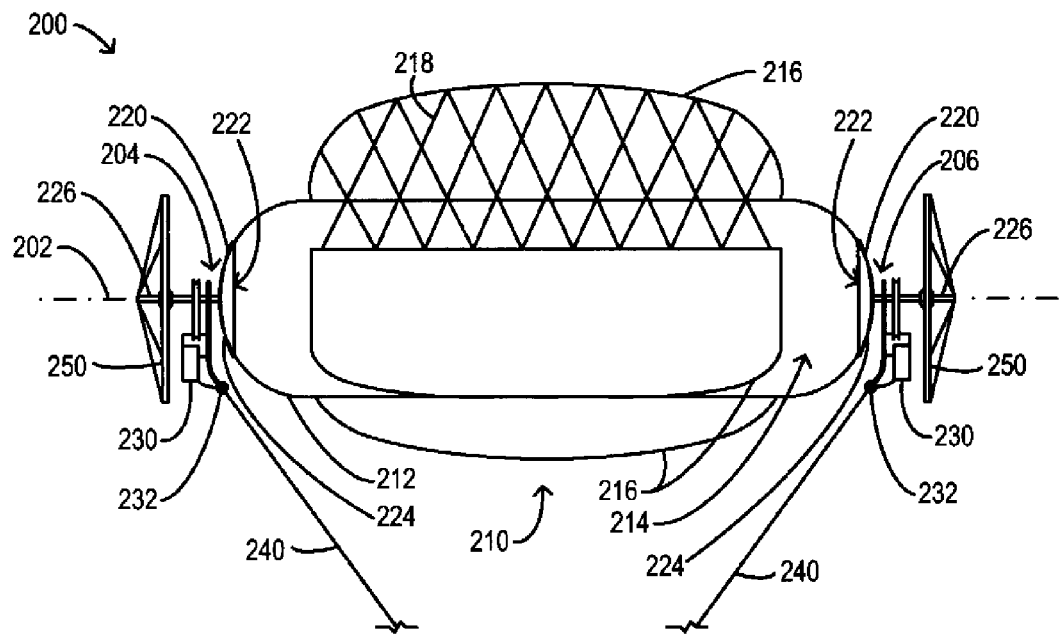
FIG. 2A and FIG. 2B are block diagrams of a system according to some embodiments.
Figure 2B:
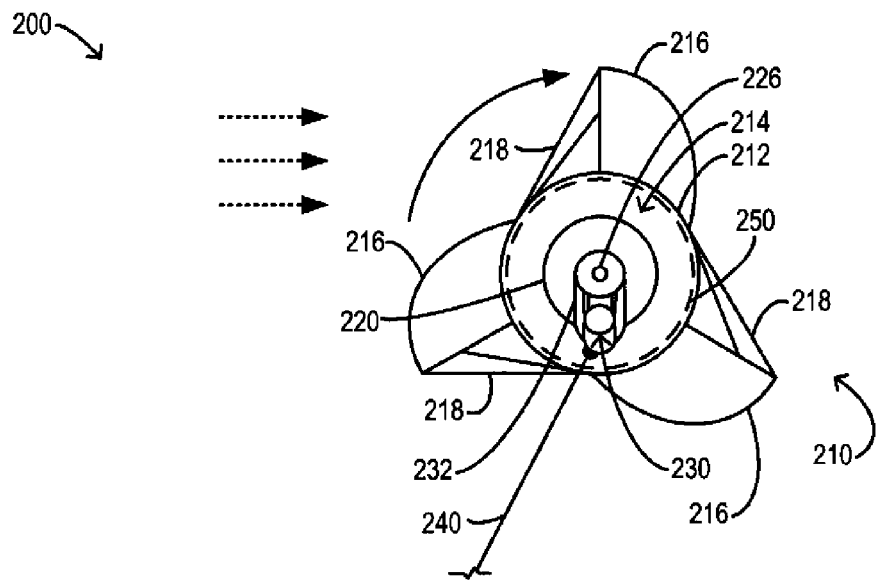

Turning to FIG. 2A and FIG. 2B, for example, block diagrams of a system 200 according to some embodiments are shown. In some embodiments, FIG. 2A shows a frontal view of the system 200, while FIG. 2B shows an end or side view of the system 200. According to some embodiments, the system 200 is similar to the system 100 described in conjunction with any of FIG. 1A and/or FIG. 1B. The system 200 may, for example, comprise a substantially horizontal axis 202, a first point 204 along the axis 202, a second point 206 along the axis 202, and/or a wind turbine 210 that rotates about the axis 202 to produce electrical energy. The wind turbine 210 may, for example, comprise a body 212 that defines an envelope 214. One or more vanes 216 and/or supports 218 may also or alternatively be coupled to the body 212. In some embodiments, the wind turbine 210 may comprise end plates 220 having inner sides 222 coupled to the body 212 and/or outer sides 224 comprising projections 226. The projections 226 may, for example, support and/or suspend one or more generators 230 and/or one or more yokes 232. The yokes 232 (and/or the generators 230) may, according to some embodiments, be coupled to one or more tethers 240. The tethers 240 may, for example, couple the wind turbine 210 to a third point (not shown in FIG. 2A or FIG. 2B) such as a ground station. In some embodiments, the wind turbine 210 may also or alternatively comprise one or more stabilizers 250 to facilitate orientation of the wind turbine 210 perpendicular (e.g., with respect to the axis 202) to a prevailing wind force.

According to some embodiments, the components of the system 200 may be similar in configuration and/or functionality to similar components associated with any of the embodiments described herein. In some embodiments, fewer or more components than are shown in FIG. 2A and/or FIG. 2B may be included in the system 200.

The wind turbine 210 may, according to some embodiments, comprise the body 212 which may, for example, be configured such that the ratio of length to diameter is approximately three to one or greater (e.g., as shown). The wind turbine 210 may also or alternatively comprise three vanes 216 spaced evenly around the circumference of the body 212. In some embodiments, the supports 218 may comprise guy wires and/or other connectors utilized to position, brace, and/or shape the vanes 216 (such as semi-rigid vanes 216). According to some embodiments, such as shown in FIG. 2A, the vanes 216 may extend along a central portion of the length of the body 212 (e.g., and not extend the entire length of the body 212).

As shown in FIG. 2A and FIG. 2B, the yokes 232 are smaller and/or shorter than the yokes 132 described in conjunction with FIG. 1A and FIG. 1B. One of the functions of the yokes 232 may, for example, comprise positioning the tethers 240 such that they are not likely to interfere with the rotation of the body 212 and/or the vanes 216. Because the vanes 216 protrude less (e.g., than the vanes 116) from the diameter of the body 212, for example, the tethers 240 may not need to be positioned as far away from the axis 202 (e.g., as they may otherwise be required with respect to the wind turbine 110 of FIG. 1A and FIG. 1B). In some embodiments, the stabilizers 250 are sized as required and/or as desired to provide self-positioning capabilities to the wind turbine 210 with respect to the prevailing wind force. According to some embodiments, the stabilizers 250 are configured to have diameters substantially equivalent to the diameter of the body 212 (e.g., as shown). In some embodiments (such as shown in FIG. 1A and FIG. 1B), the stabilizers 250 may alternatively comprise diameters and/or dimensions smaller than the body 112 and/or than the protrusion of the vanes 216. In FIG. 2B, the stabilizer 250 is shown in phantom to increase visibility of components (e.g., the end plate 220 and/or the generator 230) that may otherwise be obscured.

Figure 3A:
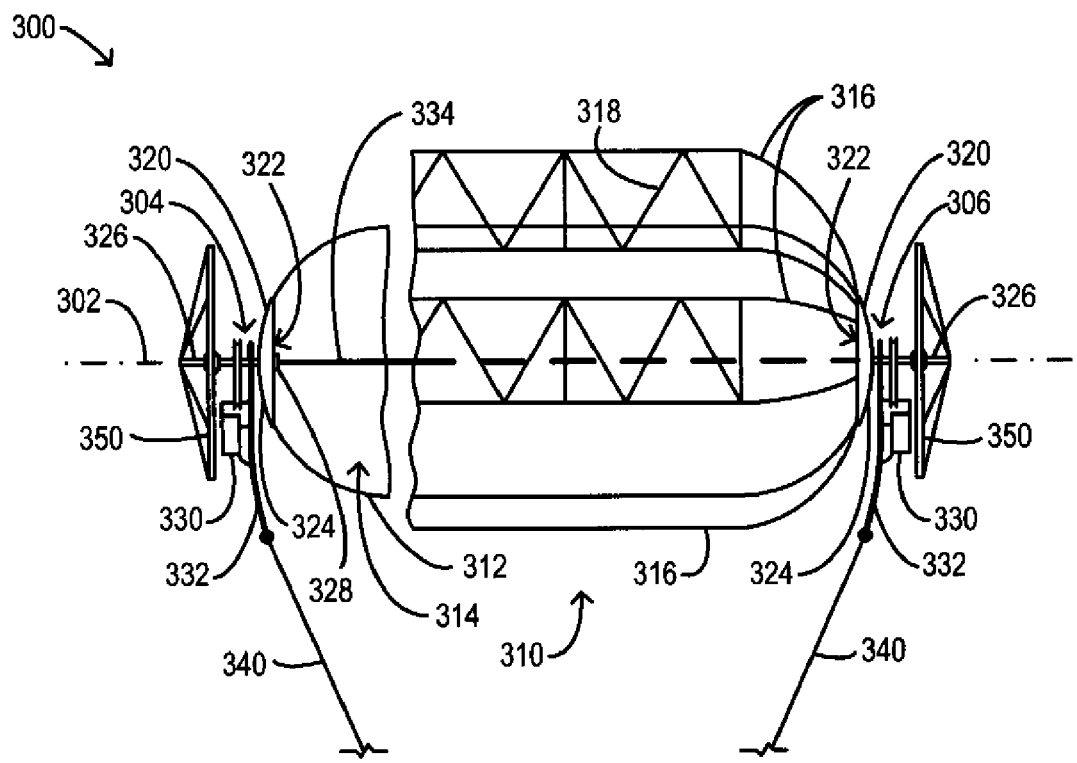
FIG. 3A and FIG. 3B are block diagrams of a system according to some embodiments.
Figure 3B:
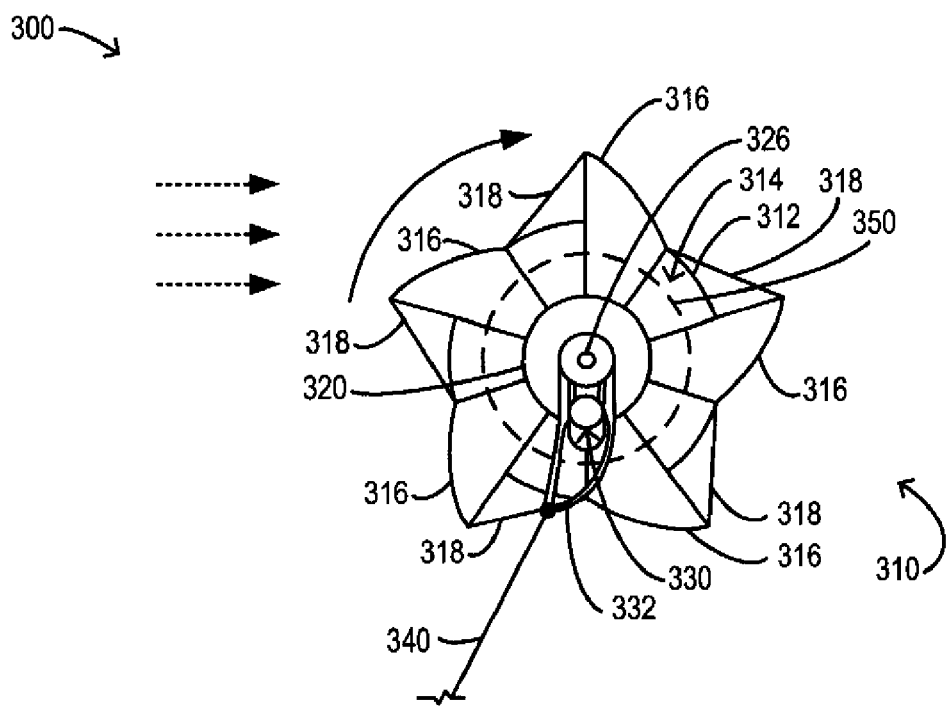

Referring to FIG. 3A and FIG. 3B, block diagrams of a system 300 according to some embodiments are shown. In some embodiments, FIG. 3A shows a frontal view of the system 300, while FIG. 3B shows an end or side view of the system 300. According to some embodiments, the system 300 may be similar to the systems 100, 200 described in conjunction with any of FIG. 1A, FIG. 1B, FIG. 2A, and/or FIG. 2B. The system 300 may, for example, comprise a substantially horizontal axis 302, a first point 304 along the axis 302, a second point 306 along the axis 302, and/or a wind turbine 310 that rotates about the axis 302 to produce electrical energy. The wind turbine 310 may, for example, comprise a body 312 that defines an envelope 314. One or more vanes 316 and/or supports 318 may also or alternatively be coupled to the body 312. In some embodiments, the wind turbine 310 may comprise end plates 320 having inner sides 322 coupled to the body 312 and/or outer sides 324 comprising projections 326. In some embodiments, the end plates 320 and/or the inner surfaces 322 thereof may also or alternatively comprise one or more internal securing points 328. The projections 326 may, for example, support and/or suspend one or more generators 330 and/or one or more yokes 332. The internal securing points 328 may, according to some embodiments, couple to one or more structural members 334. The yokes 332 (and/or the generators 330) may, for example, be coupled to one or more tethers 340. The tethers 340 may, according to some embodiments, couple the wind turbine 310 to a third point (not shown in FIG. 3A or FIG. 3B) such as a ground station. In some embodiments, the wind turbine 310 may also or alternatively comprise one or more stabilizers 350 to facilitate orientation of the wind turbine 310 perpendicular (e.g., with respect to the axis 302) to a prevailing wind force.

According to some embodiments, the components of the system 300 may be similar in configuration and/or functionality to the similarly-named components associated with any of the embodiments described herein. In some embodiments, fewer or more components than are shown in FIG. 3A and/or FIG. 3B may be included in the system 300.

The wind turbine 310 may, according to some embodiments, comprise the body 312 which may, for example, be configured such that the ratio of length to diameter is about two or two and one half to one (e.g., as shown). The wind turbine 310 may also or alternatively comprise five vanes 316 spaced evenly around the circumference of the body 312. In some embodiments, the supports 318 may comprise aluminum, plastic, graphite composite material, and/or other lightweight poles and/or other connectors utilized to position, brace, and/or shape the vanes 316 (such as rigid vanes 316 comprised of fiberglass and/or other resins). According to some embodiments, a plurality of vanes 316 may increase the possibility and/or likelihood that the wind turbine 310 is self-starting (e.g., when deployed into a prevailing wind and/or other air flow).

In some embodiments, the end plates 320 of the wind turbine 310 may comprise the internal securing points 328. The internal securing points 328 may, for example, be utilized to couple to the structural member 334. According to some embodiments, the structural member 334 may comprise any number, type, and/or configuration of support that extends substantially along the axis 302 within the envelope 314. The structural member 334 may, in some embodiments, couple to an internal securing point 328 situated on the inner surface 322 of each of the end plates 320. According to some embodiments, the structural member 334 may comprise a strap, a cable, an axle, and/or a tube. The structural member 334 may, for example, comprise a tensioning member that is operable to maintain a substantially fixed distance between the end plates 320. In the case that the wind turbine 310 comprises a smaller version of the envelope 314 (such as a backpack version) the structural member 334 may, for example, simply be or include a lightweight tensioning cable. In some embodiments, the structural member 334 may comprise a plurality of structural members. The structural member 334 may, for example, comprise spreader members (not shown) that emanate from the structural member 334 and extend outwardly from the axis 302. The spreader members may, according to some embodiments, be coupled to the envelope 314.

According to some embodiments, the body 312, the envelope 314, and/or the vanes 316 may comprise other structural members and/or devices (not shown). In the case that the wind turbine 310 is constructed in accordance with larger dimensions, for example, a tri-axial strapping may be included in and/or coupled to the fabric of the envelope 314. Two strap lines running in opposite directions along the body 312 may, for example, be configured to form a double helix. In some embodiments, this double helix strapping may define the shape and/or extents of the envelope 314 and/or may allow for a greater level of over pressurization. According to some embodiments, a plurality of longitudinal straps and/or cables may also or alternatively be run along the length of the body 312 and/or the envelope 314. The longitudinal straps may, for example, run substantially between the first and second points 304, 306 and/or may be coupled to the end plates 320. In some embodiment, the longitudinal straps may cross the double helix straps and/or is coupled thereto. Such a configuration may, for example, form a six-point junction of tri-axial straps to substantially limit the overall volume of the envelope 314, define the structure and/or shape of the envelope 314, and/or to increase the load capacity of the envelope 314.

In some embodiments, the body 312 may define the envelope 314 that may, for example, be open on both ends at and or near the first and second points 304, 306. The envelope 314 may, for example, be pressurized to apply a force upon the inner surfaces 322 of the end plates 320, which may, for example, be operable to substantially seal the open ends of the envelope 314. The wind turbine 310 and/or the end plates 320 may, in some embodiments, comprise one or more seals, gaskets, securing rings, and/or other devices that are operable to substantially create a hermetic seal at the coupling of the envelope 314 and the end plates 320. In some embodiments, the structural member 334 coupled to the internal securing points 328 may facilitate gas retention within the pressurized envelope 314 (e.g., by maintaining a fixed distance between the end plates 320 and/or otherwise facilitating the maintenance of the shape of the body 312). In some embodiments, the envelope 314 may comprise a substantially continuous envelope of gas and/or pressurized gas (e.g., a single chamber).

According to some embodiments, such as in the case that the wind turbine 310 is configured to be relatively large in length and/or diameter, the wind turbine 310 may also or alternatively comprise one or more ballonets (not shown). Ballonets, such as those utilized in various airship designs, may comprise, for example, an active internal plenum within the volume of the envelope 314. The ballonet may, according to some embodiments, comprise an active blower and/or contain a volume of gas to facilitate maintaining an active positive pressure against the gas within the envelope 314. The active pressure may, for example, facilitate maintaining a positive super-pressure to maintain the overall shape of the body 312 and/or the envelope 314. In some embodiments, either or both of the ballonet and the envelope 314 may comprise pressure relief valves (not shown) as desired. According to some embodiments, the ballonet is incorporated onto the structural member 334. The ballonet may, for example, comprise a blower and/or pressure release valve located within a tubular structural member 334 that passes through an envelope of the ballonet. In such a manner, for example, the ballonet may utilize the structural member 334 as a controlled air path operable to interface with the atmosphere outside of the envelope 314. The interface may, according to some embodiments, be integrated into one or more of the end plates 320.

Figure 4A:
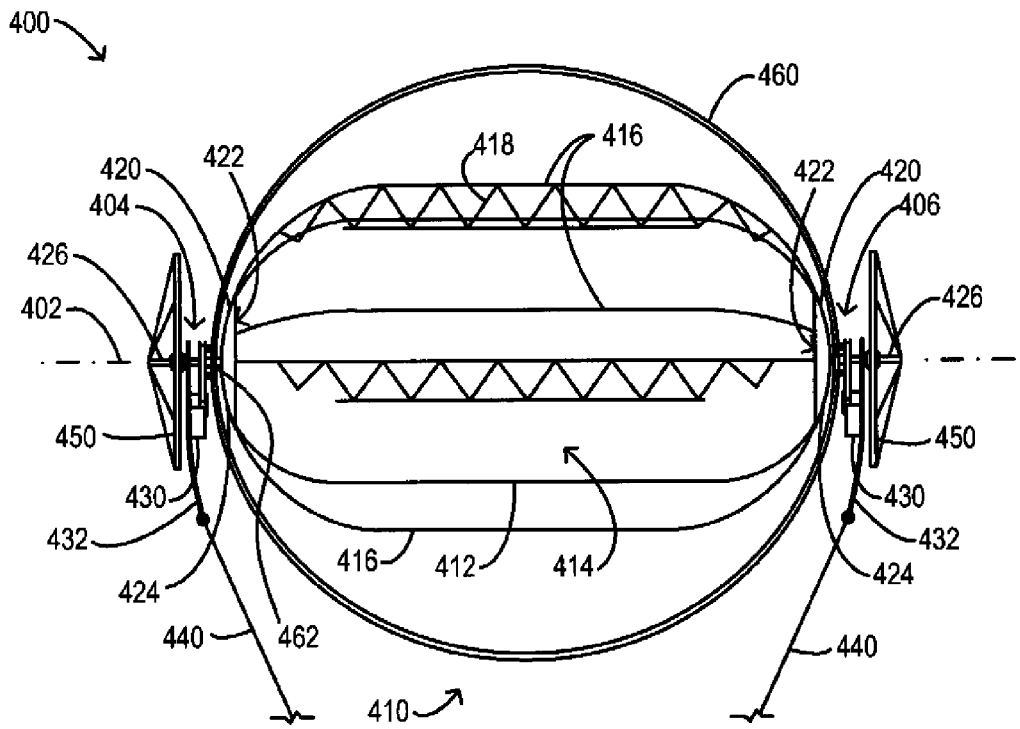
FIG. 4A and FIG. 4B are block diagrams of a system according to some embodiments.
Figure 4B:
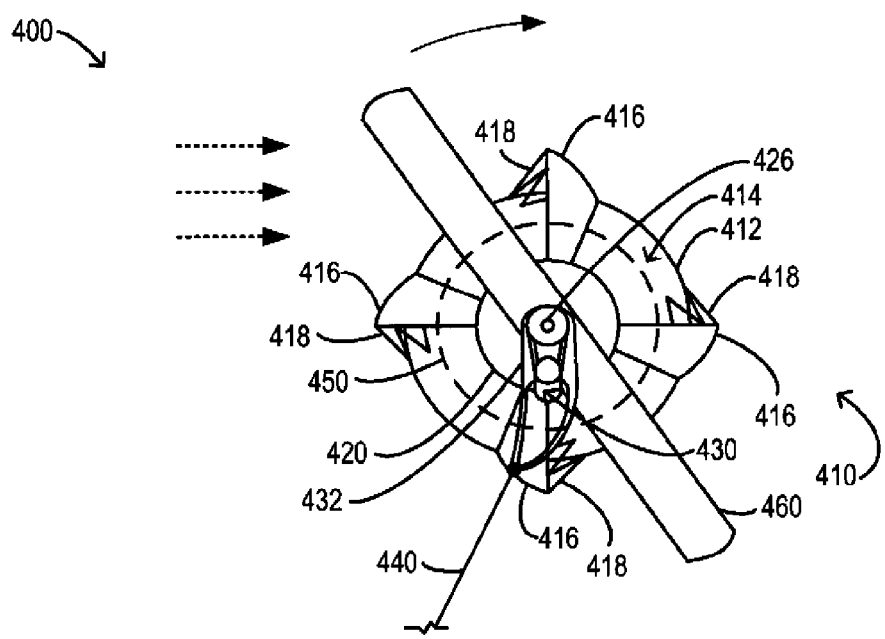

Turning to FIG. 4A and FIG. 4B, block diagrams of a system 400 according to some embodiments are shown. In some embodiments, FIG. 4A shows a frontal view of the system 400, while FIG. 4B shows an end or side view of the system 400. According to some embodiments, the system 400 may be similar to the systems associated with any of the embodiments described herein. The system 400 may, for example, comprise a substantially horizontal axis 402, a first point 404 along the axis 402, a second point 406 along the axis 402, and/or a wind turbine 410 that rotates about the axis 402 to produce electrical energy. The wind turbine 410 may, for example, comprise a body 412 that defines an envelope 414. One or more vanes 416 and/or supports 418 may also or alternatively be coupled to the body 412. In some embodiments, the wind turbine 410 may comprise end plates 420 having inner sides 422 coupled to the body 412 and/or outer sides 424 comprising projections 426. The projections 426 may, for example, support and/or suspend one or more generators 430 and/or one or more yokes 432. The yokes 432 (and/or the generators 430) may, for example, be coupled to one or more tethers 440. The tethers 440 may, according to some embodiments, couple the wind turbine 410 to a third point (not shown in FIG. 4A or FIG. 4B) such as a ground station. In some embodiments, the wind turbine 410 may also or alternatively comprise one or more stabilizers 450 to facilitate orientation of the wind turbine 410 perpendicular (e.g., with respect to the axis 402) to a prevailing wind force. The wind turbine 410 may, in some embodiments (such as shown in FIG. 4A and FIG. 4B), also or alternatively comprise a rotor 460.

According to some embodiments, the components of the system 400 may be similar in configuration and/or functionality to the similarly-named components associated with any of the embodiments described herein. In some embodiments, fewer or more components than are shown in FIG. 4A and/or FIG. 4B may be included in the system 400.

The wind turbine 410 may, according to some embodiments, be similar in type, configuration, and/or functionality to the wind turbines 110, 210, 310 described herein. In some embodiments, the wind turbine 410 may comprise the rotor 460. The rotor 460 may, for example, comprise one or more blades that are operable to rotate about the axis 402 and/or about the body 412 of the wind turbine 410. As shown in FIG. 4A and FIG. 4B, for example, the rotor 460 may comprise two blades disposed substantially one hundred and eighty degrees apart and coupled, at their meeting points (e.g., at and or near the first and second points 404, 406), to the wind turbine 410. In some embodiments, the blades of the rotor 460 are hollow or solid. As shown in FIG. 4A and FIG. 4B, the blades of the rotor 460 may also or alternatively be bowed to form a substantially annular-shaped rotor 460, such that the rotor 460 may rotate about the body 412 of the wind turbine 410. According to some embodiments, the rotor 460 is substantially bowed such that the rotor 460 may not interfere with the rotation of the body 412 and/or the vanes 414. In some embodiments, the vanes 414 are configured in a low profile (e.g., as shown) to reduce the likelihood of interference with the rotor 460. Interference may, for example, refer to physical, fluid flow, and/or other potential interferences between the rotating elements (e.g., the body 412 and the vanes 414 and/or the rotor 460).

In some embodiments, the rotor 460 and/or any blades thereof may comprise one or more airfoil cross-sections and/or are narrow, strip-like, and/or generally circumferential in nature. The rotor 460 may, for example, be similar in functionality and/or configuration to a Darrieus-type rotor (e.g., as described in U.S. Pat. No. 1,835,018 issued to Darrieus), with the axis 402 transverse and/or perpendicular to the wind and/or other air force. According to some embodiments, the rotor 460 may rotate in the same direction as and/or at a substantially faster rate than the body 412. The rotor 460 may also or alternatively rotate independently and/or substantially independently of the body 412. The rotor 460 may, for example, be coupled to the projections 426 via a drive unit 362. The drive unit 362 may, according to some embodiments, mechanically couple the rotor 460 to the generators 430 and/or may at least partially mechanically couple the rotor 460 to the projections 526.

The drive unit 462 may, for example, be a coupling, gear box, transmission, and/or other device operable to allow the rotor 460 to be coupled to the rotation of the body 412 in some circumstances, while also allowing the rotor 460 to rotate independently of the body 412 in other circumstances. The drive unit 462 may, according to some embodiments, allow the body 412 to rotate the rotor 460 to initiate rotation (e.g., as start-up) of the rotor 460, while at some point after the initiation of rotor 460 rotation, the drive unit 460 may allow the rotor 460 to spin independently (and/or at a higher rate) than the body 412. The rotor 460 may, for example, not be self-starting and may utilize the rotation of the body 412 to initiate rotor 460 rotation. In some embodiments, the generators 430 may generate electrical energy from the rotation of either or both of the body 412 and/or the rotor 460.

Figure 5A:
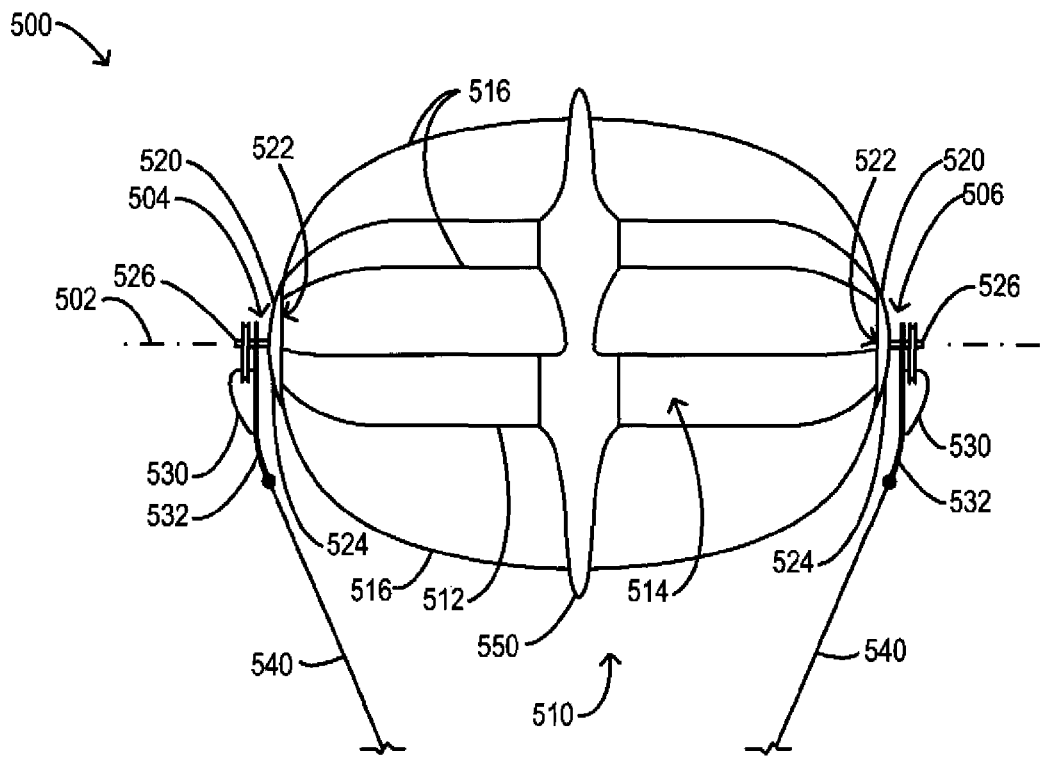
FIG. 5A and FIG. 5B are block diagrams of a system according to some embodiments.
Figure 5B:
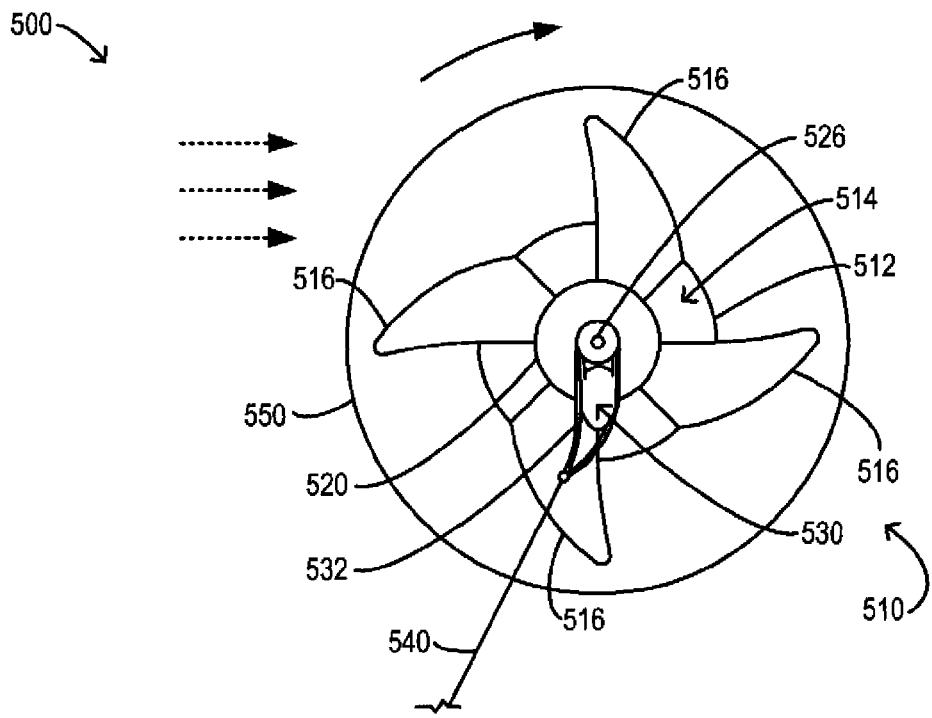

Referring now to FIG. 5A and FIG. 5B, block diagrams of a system 500 according to some embodiments are shown. In some embodiments, FIG. 5A shows a frontal view of the system 500, while FIG. 5B shows an end or side view of the system 500. According to some embodiments, the system 500 may be similar to the systems described in conjunction with any of the embodiments herein. The system 500 may, for example, comprise a substantially horizontal axis 502, a first point 504 along the axis 502, a second point 506 along the axis 502, and/or a wind turbine 510 that rotates about the axis 502 to produce electrical energy. The wind turbine 510 may, for example, comprise a body 512 that defines an envelope 514. One or more vanes 516 may also or alternatively be coupled to the body 512. In some embodiments, the wind turbine 510 may comprise end plates 520 having inner sides 522 coupled to the body 512 and/or outer sides 524 comprising projections 526. The projections 526 may, for example, support and/or suspend one or more generators 530 and/or one or more yokes 532. The yokes 532 (and/or the generators 530) may, for example, be coupled to one or more tethers 540. The tethers 540 may, according to some embodiments, couple the wind turbine 510 to a third point (not shown in FIG. 5A or FIG. 5B) such as a ground station. In some embodiments, the wind turbine 510 may also or alternatively comprise an integral stabilizer 550 to facilitate orientation of the wind turbine 510 perpendicular (e.g., with respect to the axis 502) to a prevailing wind force.

According to some embodiments, the components of the system 500 may be similar in configuration and/or functionality to the similarly-named components associated with any of the embodiments described herein. In some embodiments, fewer or more components than are shown in FIG. 5A and/or FIG. 5B may be included in the system 500.

The wind turbine 510 may, according to some embodiments, be similar in type, configuration, and/or functionality to the wind turbines 110, 210, 310, 410 described herein. In some embodiments, the wind turbine 510 may comprise the integral stabilizer 550. The integral stabilizer 550 may, for example, define a portion of the envelope 514. The vanes 516 may also or alternatively define one or more portions of the envelope 514. In other words, the wind turbine 510 may, according to some embodiments, comprise a single envelope 514 that is defined by a single cavity including the body 512, the vanes 516, and/or the stabilizer 550. In some embodiments, the entire envelope 514 is pressurized, inflatable, collapsible, and/or constructed of one or more pliant and/or lightweight materials. The envelope 514 may, for example, be an inflatable form that, when pressurized with a gas (e.g., a lighter-than-air gas and/or atmospheric air) may define the structure and/or shape of the body 512, the vanes 516, and/or the integral stabilizer 550.

Figure 6:
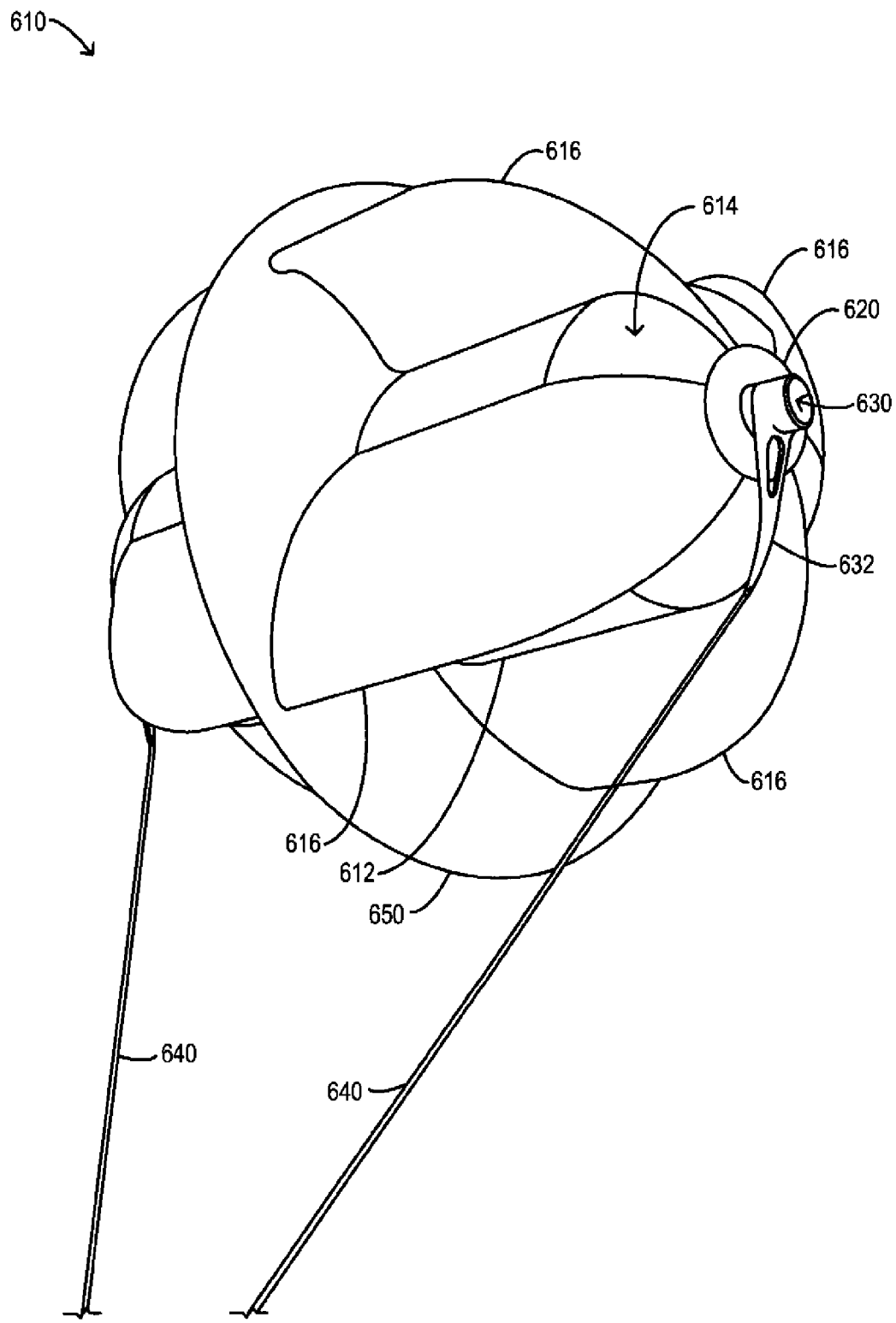
FIG. 6 is a perspective diagram of a wind turbine according to some embodiments.

FIG. 6 shows a perspective view of a wind turbine 610 according to some embodiments. In some embodiments, the wind turbine 610 is similar to the wind turbine 510 described in conjunction with FIG. 5A and/or FIG. 5B. The wind turbine 610 may, for example, comprise a body 612 defining (at least partially) an envelope 614. The wind turbine 610 may also or alternatively comprise one or more vanes 616, end plates 620, generators 630, yokes 632, and/or tethers 640. In some embodiments, the wind turbine 610 may comprise an integral stabilizer 650.

The integral stabilizer 650 may, for example, be a portion of and/or be coupled to the body 612 and/or the vanes 616. In some embodiments, the body 612, the vanes 616, and/or the integral stabilizer 650 may comprise and/or define the envelope 614. The wind turbine 610 may, for example, comprise a single inflatable envelope 614 that defines the position, structure, and/or shape of the body 612, the vanes 616, and/or the integral stabilizer 650. According to some embodiments, the wind turbine 610 may comprise strapping, cables, and/or supports (not shown) inside of and/or within the envelope 614 (such as the structural member 334 and/or other structural devices or objects described herein). In some embodiments, the predominantly inflatable and/or non-rigid nature of the wind turbine 610 (e.g., except for the end plates 620, generators 630, and/or yokes 632) may facilitate storage, deployment, transportation, mobility, and/or management of the wind turbine 610.

Figure 7A:
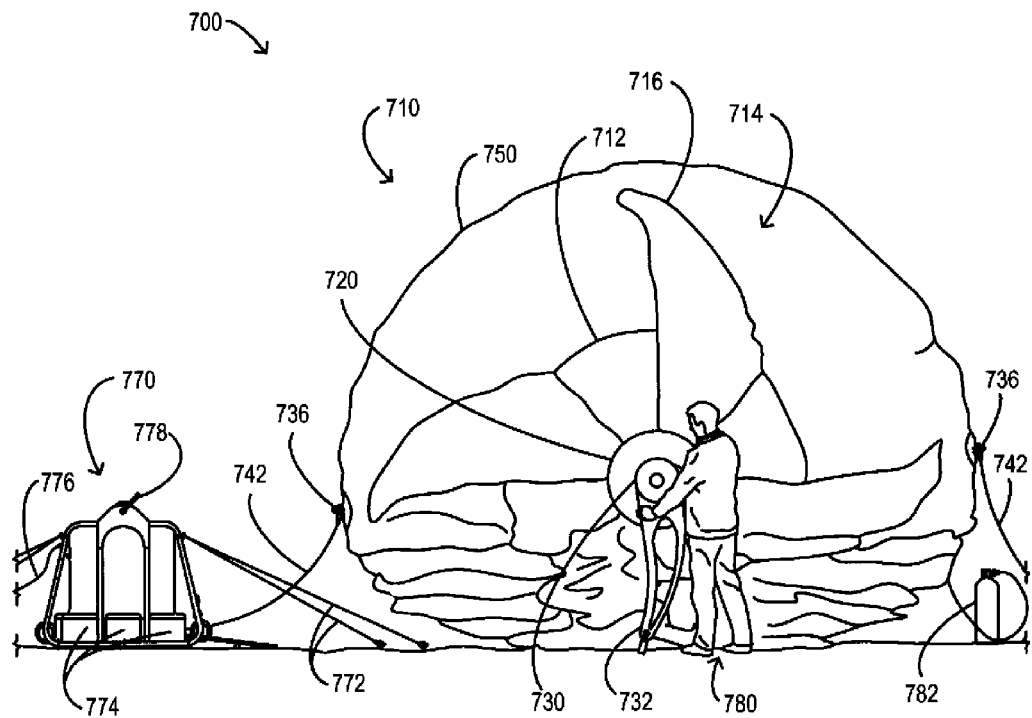
FIG. 7A and FIG. 7B are illustrations of a system according to some embodiments.
Figure 7B:
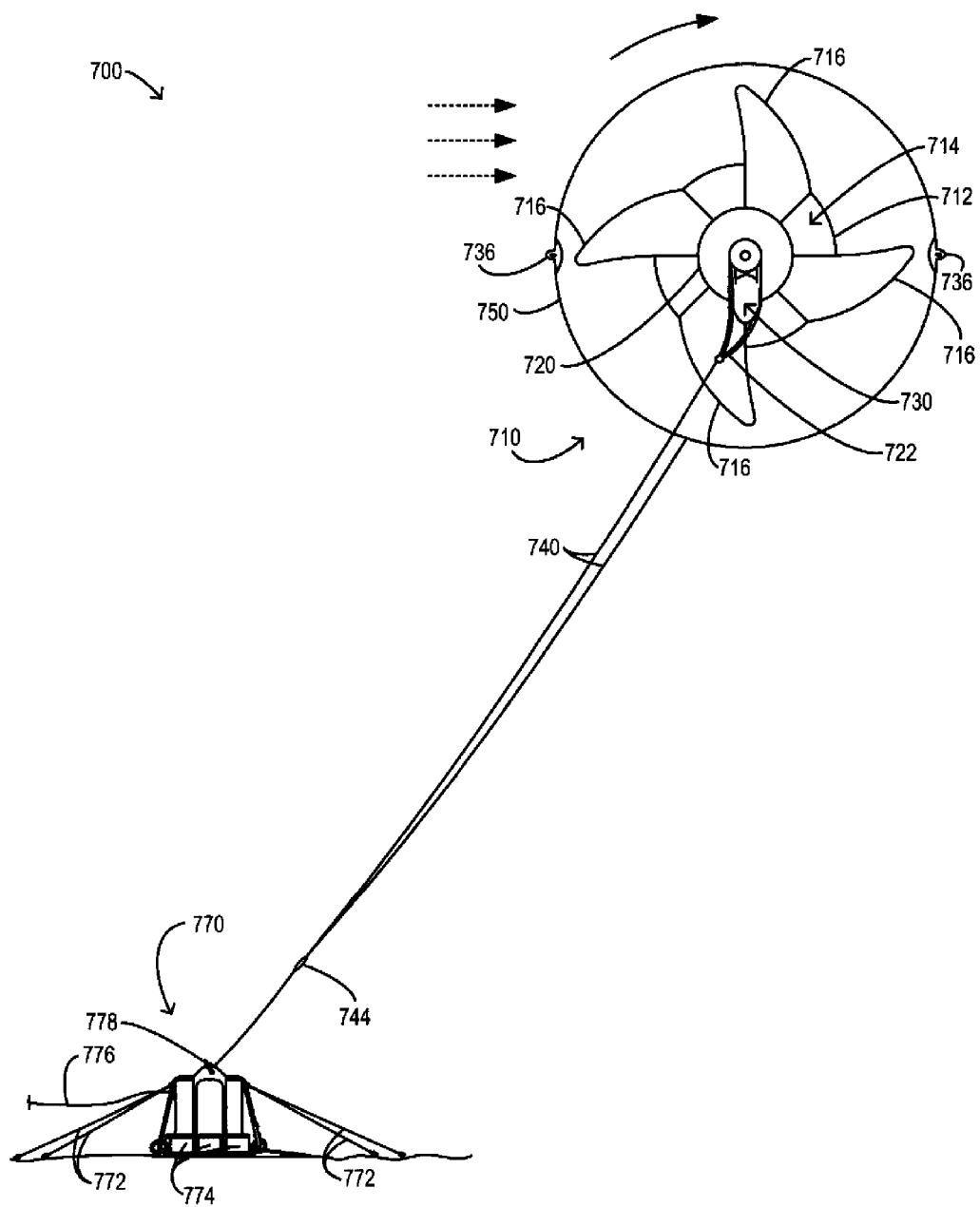

Turning to FIG. 7A and FIG. 7B, for example, illustrations of a system 700 according to some embodiments are shown.

FIG. 7A, for example, shows an illustration of the system 700 associated with deploying a wind turbine 710, while FIG. 7B shows an illustration of the system 700 where the wind turbine 710 is deployed. According to some embodiments, the wind turbine 710 may comprise a single collapsible and/or inflatable unit (e.g., as shown) including a body 712, an envelope 714, and/or one or more vanes 716. The envelope 714 and/or the body 712 may, in some embodiments, pressure against two end plates 720. The wind turbine 710 may also or alternatively comprise one or more generators 730, yokes 732, and/or one or more external securing points 736. In some embodiments, the yokes 732 are coupled to one or more tethers 740 (as shown in FIG. 7B) and/or the external securing points 736 are coupled to one or more stays 742 (as shown in FIG. 7A). In some embodiments, the tethers 740 may also or alternatively be coupled to a tether coupler 744 (as shown in FIG. 7B). According to some embodiments, the wind turbine 710 may comprise an integral stabilizer 750. The envelope 714 may, for example, define various portions of the wind turbine 710 such as the body 712, the vanes 716, and/or the integral stabilizer 750.

According to some embodiments, the components of the system 700 may be similar in configuration and/or functionality to the similarly-named components described in conjunction with any of the embodiments provided herein. In some embodiments, fewer or more components than are shown in FIG. 7A and/or FIG. 7B may be included in the system 700.

In FIG. 7A, the wind turbine 710 may be prepared for deployment at a ground station 770 (e.g., a point, location, and/or area on or near the ground). In some embodiments, the ground station 770 may comprise a fixed and/or semi-fixed location at and/or near ground level. According to some embodiments, the ground station 770 may comprise any type of location that is or becomes suitable for deploying the wind turbine 710. The ground station 770 may, for example, comprise a vehicle, a building, and/or any other practicable mobile and/or fixed location. In some embodiments, the ground station 770 may comprise a device that includes guy wires 772 to facilitate maintaining the device at and/or near a specific point (e.g., on the ground). According to some embodiments, the ground station 770 may comprise one or more electrical components 774.

The electrical components 774 may, for example, comprise any number, type, and/or configuration of batteries, inverters, transformers, capacitors, printed circuit boards, and/or other electrical devices that are or become known or practicable for facilitating the receipt, transfer, management, conversion, inversion, and/or other processing of electrical energy generated by the wind turbine 710. In some embodiments, the electrical components 774 may comprise one or more power inverters to convert Direct Current (DC) power generated by the generators 730 into Alternating Current (AC) for use in powering one or more electrical devices (not shown). According to some embodiments, the ground station 770 may comprise an electrical feed 776 to direct electrical energy. The electrical feed 776 may, for example, transfer and/or transmit DC and/or AC electrical energy from the ground station 770 to power one or more electrical devices (not shown). In some embodiments, the ground station 770 may also or alternatively comprise a winch 778 that is utilized, for example, to deploy and/or retrieve the wind turbine 710 (e.g., by acting upon the tethers 740 and/or the stays 742).

As shown in FIG. 7A, for example, the stays 742 are coupled to the external securing points 736 during deployment and/or preparation of the wind turbine 710. The stays 742 may, for example, be utilized to prevent premature and/or undesired movement and/or lifting of the wind turbine 710. According to some embodiments, the stays 742 may assist an operator 780 in preparing and/or deploying the wind turbine 710. In some embodiments, a single operator 780 may, for example, be capable of managing, preparing, and/or deploying the wind turbine 710, even in the case that the wind turbine 710 comprises dimensions larger than the operator 780 (e.g., as shown). The operator 780 may, for example, connect the wind turbine 710 and/or the envelope 714 to a pressurized gas source 782 to begin pressurization of the envelope 714. In some embodiments, the pressurized gas source 782 may comprise a canister and/or other container or source of a lighter-than-air gas such as helium and/or hydrogen. According to some embodiments, the wind turbine 710 is inflated via other means. The operator 780 may, for example, utilize an air compressor (not shown) and/or a manual blow tube (also not shown) to fill the envelope 714 with a gas such as atmospheric and/or exhaled air.

In some embodiments, the envelope 714 of the wind turbine 710 is pressurized (e.g., by the operator 780) and guided aloft (e.g., as shown in FIG. 7B). The wind turbine 710 may, for example, be raised into a wind force to facilitate and/or accomplish deployment to the aloft position. The wind turbine 710 may then, for example, rotate to generate electrical energy (e.g., via the generators 730). In some embodiments, the electrical energy is provided (e.g., via the tethers 740) to the ground station 770. In some embodiments, such as in the case of larger and/or lighter-than-air versions of the wind turbine 710, the deployed position of the wind turbine 710 is ten thousand feet (e.g., above ground level and/or above sea level) or more. Altitudes utilized for deployment of the wind turbine 710 may, for example, subject the wind turbine 710 to more powerful, sustainable, prevalent, and/or prevailing wind forces than tower-mounted and/or other conventional wind turbines may experience.

According to some embodiments, the system 700 may comprise the tether coupler 744. The tether coupler 744 may, as shown in FIG. 7B for example, join two or more tethers 740 connected to the wind turbine 710 (e.g., to the yokes 732) to a single tether 740 connected to the ground station 770 (e.g., to the winch 778). In some embodiments, the tether coupler 774 may be operable to be manipulated to affect the orientation of the wind turbine 710. Although the wind turbine 710 may be substantially and/or completely self-orienting (e.g., with respect to the transverse wind force) due at least in part to the integral stabilizer 750, for example, it may be desirable, in some circumstances, to manipulate the position and/or orientation of the wind turbine 710 via the ground station 770. In some embodiments, the operator 780 may interface with the ground station 770 and/or the tether coupler 744, for example, to position, re-position, and/or orient the wind turbine 710 as desired.

Figure 8:
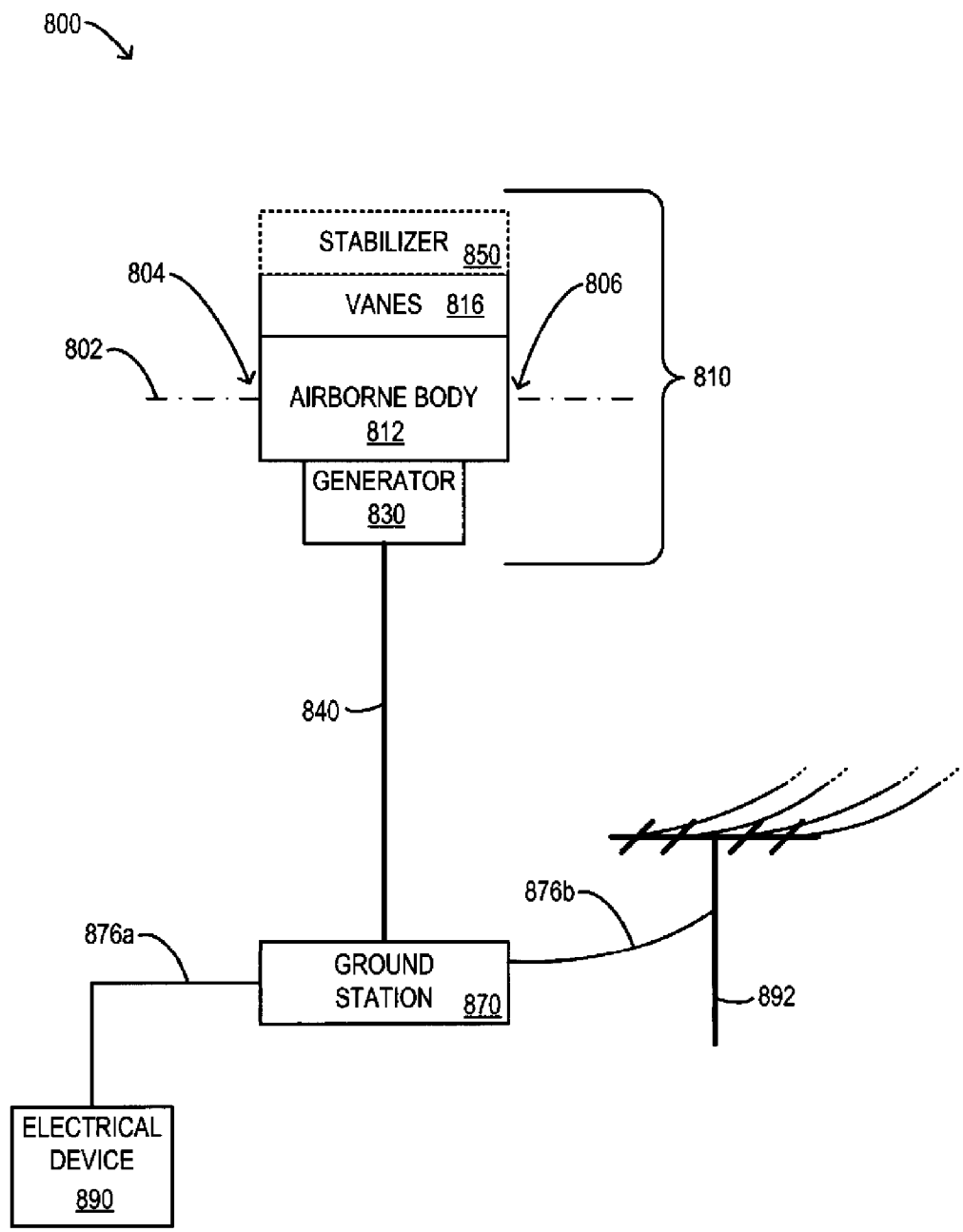
FIG. 8 is a block diagram of a system according to some embodiments.

Turning to FIG. 8, a block diagram of a system 800 that may operate in accordance with any of the embodiments described herein. The system 800 may, for example, comprise a substantially horizontal axis 802, a first point 804 along the axis 802, a second point 806 along the axis 802, and/or a wind turbine 810 that rotates about the axis 802 to produce electrical energy. The wind turbine 810 may, for example, comprise an airborne body 812 having one or more vanes 816 and/or one or more generators 830. In some embodiments, the wind turbine 810 is coupled to a tether 840 and/or may comprise one or more stabilizers 850. The tether 840 may, for example, couple the wind turbine 810 to a ground station 870. The ground station 870 may, for example, supply electrical energy (e.g., via electrical feeds 876a-b) generated by the wind turbine 810 to one or more electrical devices 890 and/or to an electrical grid 892.

According to some embodiments, the components of the system 800 may be similar in configuration and/or functionality to components associated with any of embodiments described herein. In some embodiments, fewer or more components than are shown in FIG. 8 may be included in the system 800.

According to some embodiments, the wind turbine 810 is carried aloft and/or lifted, at least in part, by the Magnus effect. The rotation of the airborne body 812 about the axis 802 may, for example, be transverse to a wind and/or other air force. In some embodiments, the vanes 816 of the airborne body 812 are oriented to catch the wind force at and/or near the upper portion or top of the airborne body 812, causing the airborne body 812 to rotate backwards from the wind force. This backwards rotation may, for example, provide a positive upward lift force created by the Magnus effect. In some embodiments, the Magnus effect may substantially raise the wind turbine 810 and/or may substantially maintain the wind turbine 810 in an aloft and deployed position. The Magnus effect may, for example, comprise the primary source of lift for the airborne body 812.

According to some embodiments, the electrical energy generated by the wind turbine 810 is provided, via the tether 840, to the ground station 870. The tether 840 may, for example, comprise any number, type, and/or configuration of structural and/or electrical cables, ties, wires, and/or other devices. In some embodiments, the tether 840 may comprise a structural cable to maintain a physical connection between the wind turbine 810 and the ground station 870, an electrical cable to transfer the electrical energy from the wind turbine 810 to the ground station 870, and/or a grounding cable to provide electrical grounding to the wind turbine 810.

According to some embodiments, the ground station 870 may provide the electrical energy via a first electrical feed 876a to an electrical device 890. In the case that the wind turbine 810 comprises a small (e.g., about ten to thirty feet in diameter and/or length) backpack and/or emergency power version, for example, the wind turbine 810 is utilized to directly power one or more electrical devices 890. The electrical devices 890 may include, for example, a camp lantern, a television, radio, and/or other appliance or device. In some embodiments, the electrical device 890 may comprise a DC device powered directly from the wind turbine 810 (e.g., via the ground station 870 and the first electrical feed 876a) and/or from battery power from batteries (not shown) of the ground station 870 associated with and/or charged by the wind turbine 810.

According to some embodiments, the ground station 870 may invert DC power received from the wind turbine 810 into AC power. The AC power is utilized, for example, to power one or more AC electrical devices 890 via the first electrical feed 876a. In some embodiments, the AC power may also or alternatively be supplied via the second electrical feed 876b to an electrical grid 892. The electrical grid 892 may, for example, comprise an interconnection to a public utility, municipal, and/or private electrical grid. In some embodiments, the electrical grid 892 may comprise any electrical distribution system and/or device. The electrical grid 892 may, for example, comprise and electrical sub-station, an electrical pole, a transformer, underground electrical wires, and/or a fuse box and/or electrical wiring system of a vehicle and/or building (such as a residence and/or business). In some embodiments, a plurality of tethers 840 and/or wind turbines 810 are coupled to and/or associated with the ground station 870. According to some embodiments, a plurality of ground stations 870 may also or alternatively supply electrical energy generated by one or more wind turbines 810 to one or more electrical grids 892 and/or electrical devices 890. "Farms" and/or "clusters" of tethered wind turbines 810 may, for example, be utilized to provide environmentally friendly electrical energy to meet electrical consumption needs.

Figure 9:
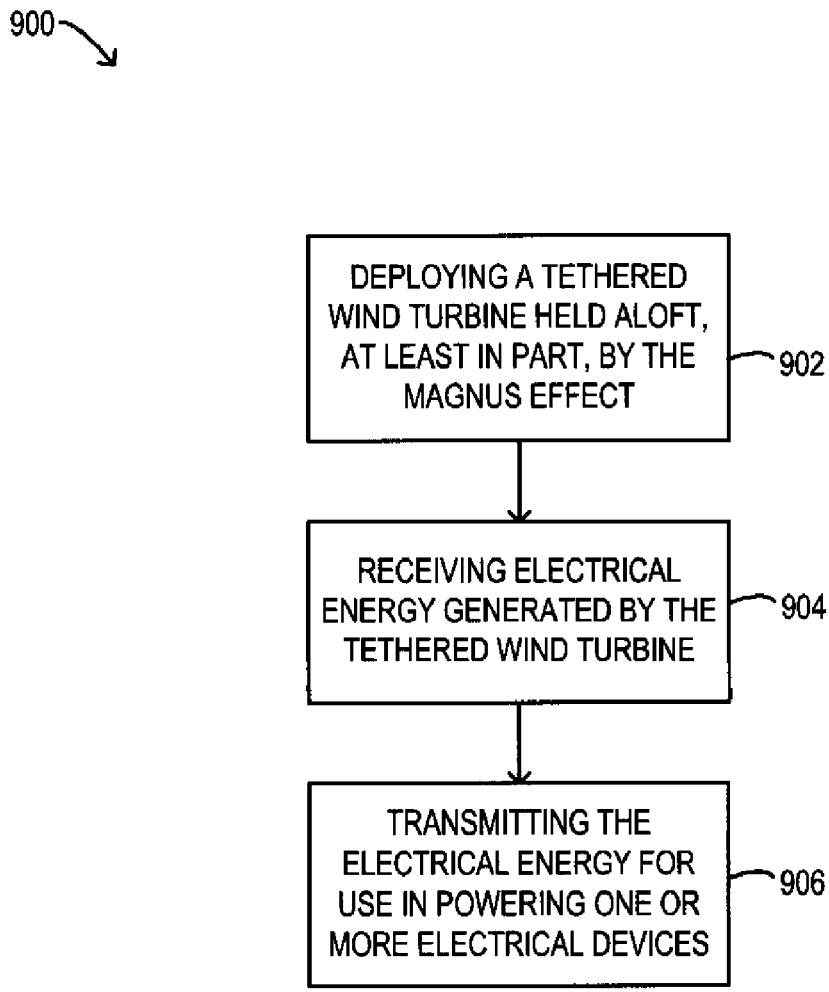
FIG. 9 is a flowchart of a method according to some embodiments.

Referring now to FIG. 9, a method 900 according to some embodiments is shown. In some embodiments, the method 900 may be conducted by and/or by utilizing any of the systems and/or any of the system components described herein. The flow diagrams described herein do not necessarily imply a fixed order to the actions, and embodiments may be performed in any order that is practicable. Note that any of the methods described herein may be performed by hardware, software (including microcode), firmware, manual means, or any combination thereof. For example, a storage medium may store thereon instructions that when executed by a machine result in performance according to any of the embodiments described herein.

In some embodiments, the method 900 may begin by deploying a tethered wind turbine held aloft, at least in part, by the Magnus effect, at 902. Any of the wind turbines described herein may, for example, be deployed to an altitude to generate electrical energy. According to some embodiments, the wind turbine is deployed by filling the wind turbine with air and/or other gases. In some embodiments, the wind turbine may be pressurized and/or super-pressurized with a gas. In the case that the gas comprises a lighter-than-air gas, the gas may also or alternatively hold the wind turbine aloft. In some embodiments, both a lifting gas and the Magnus effect may cause the wind turbine to rise to a deployed elevation.

The method 900 may continue, according to some embodiments, by receiving electrical energy generated by the tethered wind turbine, at 904. The wind turbine may, for example, rotate and/or spin about a horizontal axis to drive one or more generators to generate electrical energy. In some embodiments, the electrical energy is received by a device, entity, and/or other object such as a ground station, building, structure (e.g., a bridge, tower, and/or other structure), and/or vehicle (e.g., a ship, aircraft, train, and/or other vehicle). In some embodiments, the same entity and/or device that facilitated, conducted, and/or was otherwise associated with the deployment of the wind turbine (e.g., at 902) may receive the electrical energy. According to some embodiments, the electrical energy may be utilized, inverted, converted, stored, and/or otherwise managed. Electrical DC energy received from the wind turbine may, for example, be converted or inverted to AC electrical energy, and/or is stored in one or more batteries or battery banks.

According to some embodiments, the method 900 may continue by transmitting the electrical energy for use in powering one or more electrical devices, at 906. The electrical energy may, for example, be transmitted to one or more electrical devices local to the device, object, and/or entity associated with deploying the wind turbine (e.g., at 902) and/or associated with receiving the energy from the wind turbine (e.g., at 904). A hiker, boater, home owner, and/or other entity or individual may utilize a small version of a wind turbine, for example, to power one or more camping, boating, and/or residential electrical devices. In some embodiments, the electrical energy may also or alternatively be transmitted for powering other electrical devices and/or for facilitating the powering of other electrical devices. In the case that the electrical energy is transmitted to a power grid (e.g., by a larger wind turbine and/or by a cluster of wind turbines), for example, the electrical energy may simply be added to the pool of electrical energy utilized by the grid to power various electrical devices (e.g., various homes and/or businesses).

According to some embodiments, the electrical energy produced by the wind turbine may be sold, traded, and/or otherwise provided to a plurality of consumers. In some embodiments, the consumers of the electrical energy may, for example, power various electrical devices utilizing the electrical energy. In some embodiments, the electrical energy is associated with incentives and/or other benefits associated with the renewable and/or environmentally friendly nature of the wind turbine and/or the method with which the electrical energy is produced. Consumers may pay a premium and/or otherwise specifically choose, for example, to utilize some or all of the energy produced by the wind turbine (and/or energy representing the electrical energy produced by the wind turbine). According to some embodiments, other intrinsic benefits and or externalities may be associated with utilizing the wind turbine and/or the "green" electrical energy produced there from.

Note that many variations and/or implementations may be provided for the embodiments described herein. For example, according to some embodiments, the vanes may be attached to the airborne body (and thus cause the airborne body to rotate). In other embodiments, the vanes may rotate while the airborne body does not.

Figure 10:
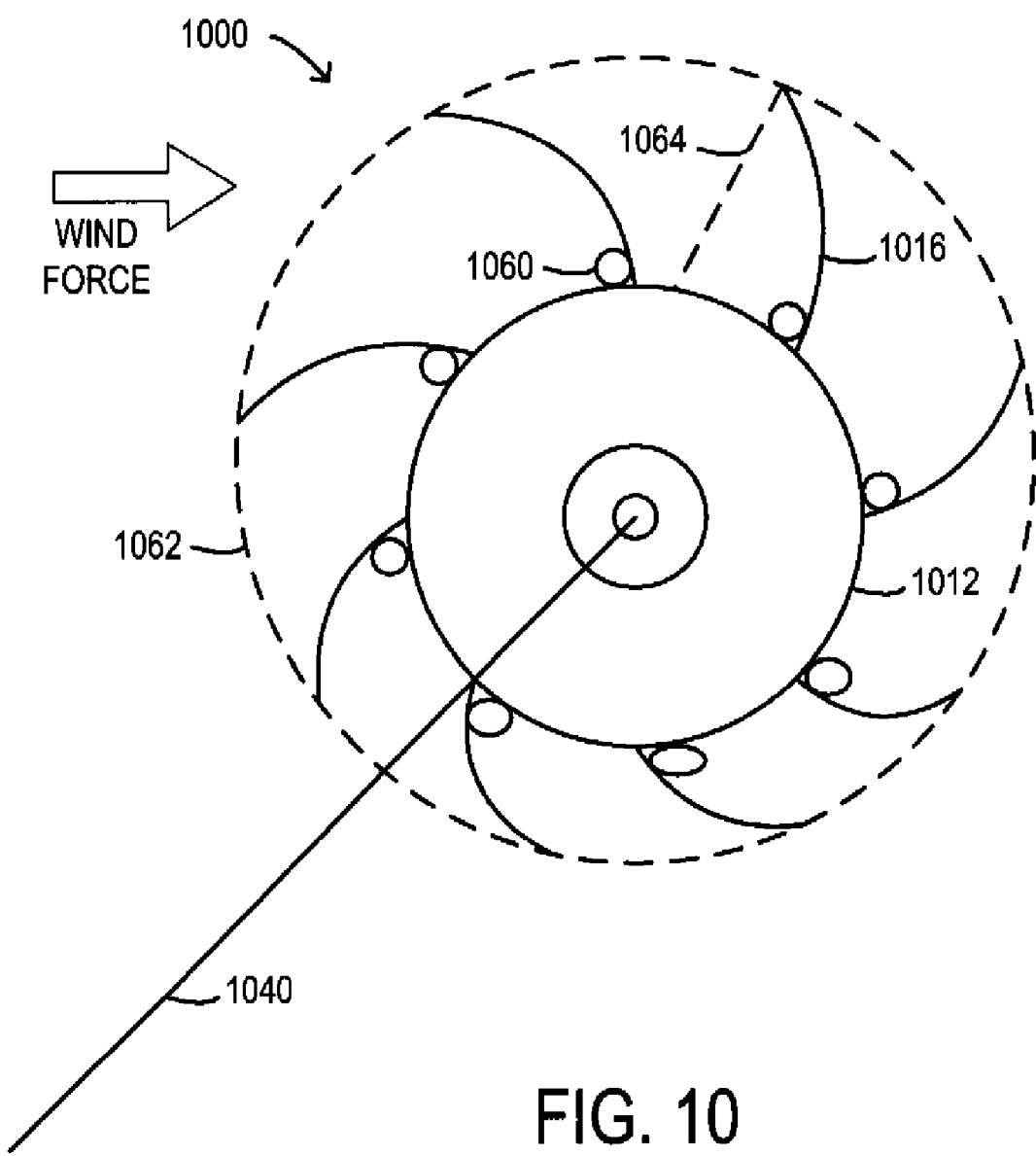
FIG. 10 is an end or side view of a wind turbine and vanes according to some embodiments.

FIG. 10 is an end or side view of a system 1000 according to some embodiments. In particular, the system 1000 may include an airborne body 1012 extending horizontally along an axis between a first point and a second point, wherein the body 1012 is at least partially filled with a gas. Note that the body 1012 may be associated with any of a number of different shapes (e.g., cylindrical, oblong, elliptical, or spherical) and/or sizes (e.g., the body might be tens or hundreds of feet long).

The system 1000 further includes two or more vanes 1016 airborne with the body 1012 such that the vanes 1016, when acted upon by a wind force perpendicular to the axis are operable to cause rotation about the axis. According to some embodiments, each vane 1016 is a horizontal blade panel attached to and extending along the body 1012. As with other embodiments, the system 1000 may also include one or more tethers 1040 coupled to anchor the body 1012 to a third point (e.g., on the ground) one or more electrical generators airborne with the body 1012 to convert rotational energy produced by the rotation about the axis into electrical energy. Note that the rotation of the body 1012 caused by the wind force on the vanes 1016 may generate a lifting force on the body 1012. The lifting force might be associated with, for example, the Magnus effect and/or the Savonius effect. Note that the lifting force may comprise a primary and/or substantial force keeping the system 1000 airborne (e.g., in combination with a lifting force provided by the gas within the body 1012).

The blade panels of the vanes 1016 may be formed of, for example, fabric and/or plastic materials. According to some embodiments, the blade panels of the vanes 1016 are attached to the body 1012 along a first horizontal edge. For example, the blade panels of the vanes 1016 might be flexibly and/or detachably attached to the body 1012 along the first horizontal edge using matching Velcro portions, snaps, and/or removable ties. Note that in some embodiments each blade panel might further includes an inflatable edge (not illustrated in FIG. 10) extending along a second horizontal edge opposite the first horizontal edge.

According to some embodiments, the blade panels of the vanes 1016 are flexibly attached to the body 1012 along the first horizontal edge. Moreover, the blade panels may be deformable (e.g., the panels may be able to change shape and/or orientation). For example, the blade panels being pushed by a wind force to cause rotation (e.g., those at the top of FIG. 10) may deform such that they extend further away from the body 1012 as compared to other panels. In the embodiment of FIG. 10, each blade panel is to be shaped at least partially by a horizontal inflatable cushion 1060 attached to the body 1012 substantially along, and proximate to, the first horizontal edge of the blade panel. In this case, cushions 10160 associated with blade panels being pushed by a wind force to cause rotation (e.g., those at the top of FIG. 10) may deform less than those associated with other panels (e.g., the cushions at the bottom of FIG. 10 may compress causing the vane 1012 to partially collapse toward the body 1012).

A second horizontal edge of the blade panels (opposite the first horizontal edge where the panels are secured to the body) may be secured by, for example, a rigid outer ring 1062. Such a ridge outer ring 1062 might be provided, for example near the center of the panels and/or at opposite ends of the panels. According to another embodiment, the blade panel is to be shaped at least partially by at least one anchor line 1064 (e.g., a guy rope) coupling the second horizontal edge of the blade panel to the airborne body 1012. According to still another embodiment, the blade panel is to be shaped by at least partially by at least one strut (not illustrated in FIG. 10) coupling the first horizontal edge to the second horizontal edge, such as a an inflatable balloon strut or a flexible pole strut.

The blade panels of the vanes 1016 may have any of a number of different shapes. For example, a cross-section of a blade panel might have a curve substantially corresponding to a "ballistic trajectory." According to some embodiments, an angle between the blade panel and a proximate surface of the airborne body 1012 is approximately forty-five degrees. Note that different blades might be associated with different shapes and/or angles and a single blade might be associated with different shapes and/or angles at different times (e.g., depending on whether it is currently located near the top or bottom of FIG. 10).

Figure 11:
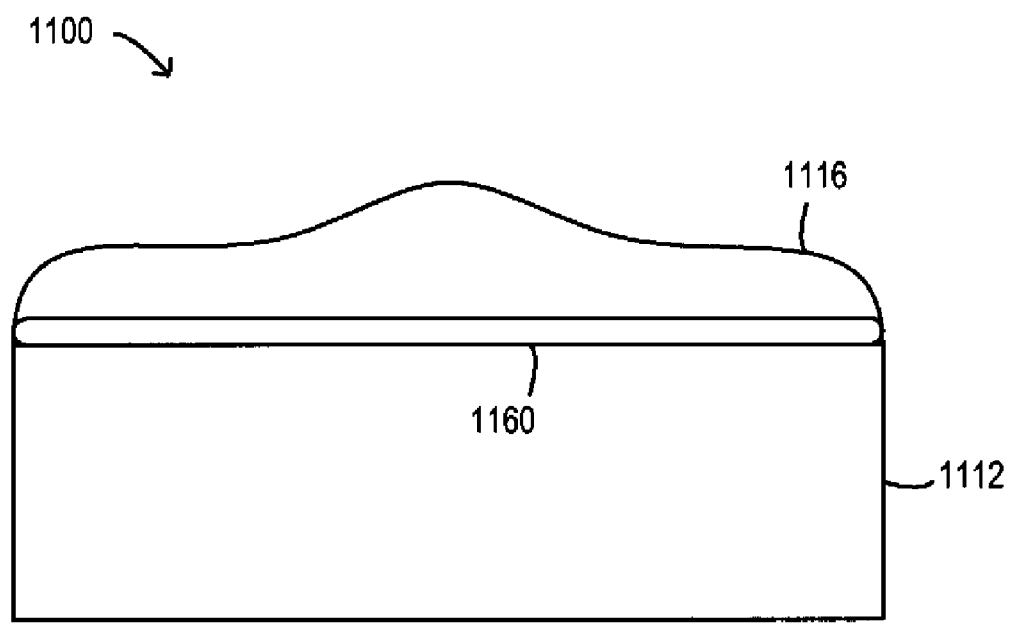
FIG. 11 is a frontal view of a wind turbine and single vane according to some embodiments.

According to some embodiments, the blade panels comprise "chevron" blades having a height near a center portion of the blade panel higher than heights near edge portions of the blade panel. For example, FIG. 11 is a frontal view of a wind turbine 1100 and single chevron blade vane 1116 coupled to a body 1112 according to some embodiments. Although a single vane 1116 is illustrated in FIG. 11 for clarity, an actual turbine 110 may have any number of blades. According to some embodiments, the chevron blade vane 1116, airborne body 1112, and/or an inflatable cushion 1160 defines an envelope area. In some cases, the envelope area is further defined by side portions associated with opposite ends of the horizontal blade panel of the vane 1116. Such an envelope area may, for example, increase the rotation of the body 1112 when acted upon by a wind force.

Figure 12:
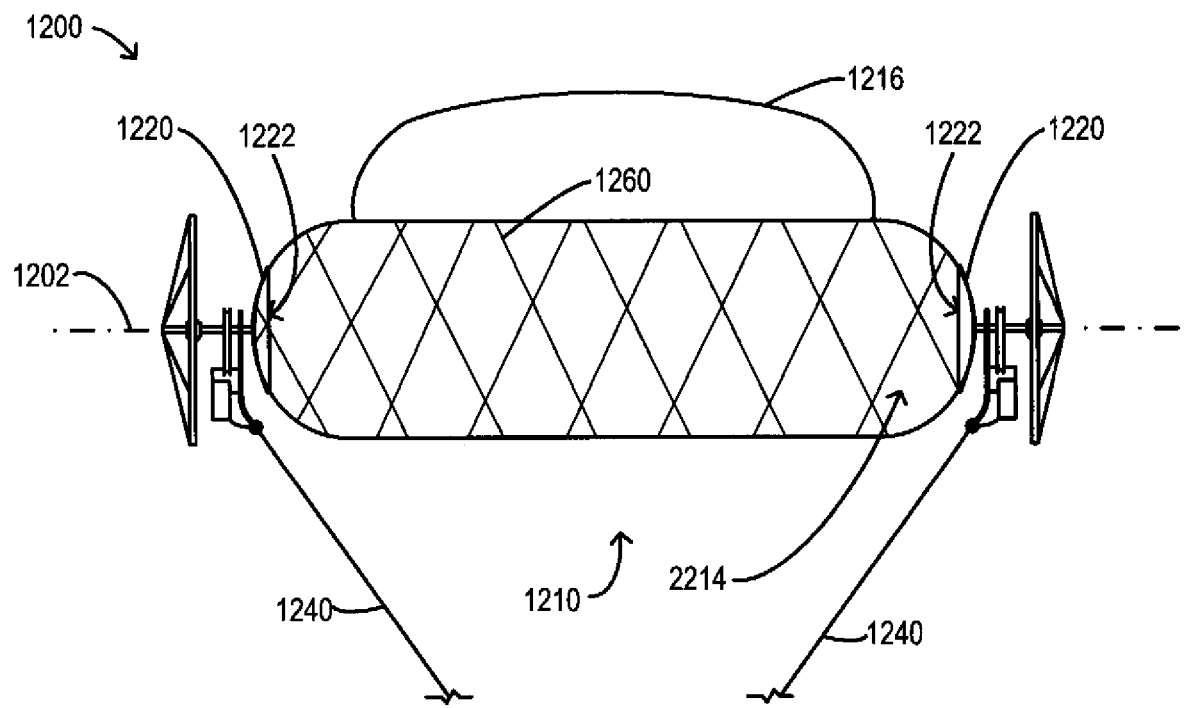
FIG. 12 is a frontal view of a wind turbine according to some embodiments.

FIG. 12 is a frontal view of a wind turbine 1200 according to some embodiments. The system 1200 may, for example, comprise a substantially horizontal axis 1202 of a wind turbine 1210 that rotates about the axis 1202 to produce electrical energy. The wind turbine 1210 may, for example, comprise a body that defines an inflatable envelope 1214.

One or more vanes 1216 and/or supports may also or alternatively be coupled to the body (note that only a single vane 1216 is illustrated in FIG. 12 for clarity). In some embodiments, the wind turbine 1210 includes end plates 1220 having inner sides 1222 coupled to the body and/or outer sides with projections that support and/or suspend one or more generators. The projections may also support one or more tethers 1240 that may, for example, couple the wind turbine 1210 to a third point (not shown in FIG. 12) such as a ground station.

According to some embodiments, the components of the system 1200 may be similar in configuration and/or functionality to similar components associated with any of the embodiments described herein. In some embodiments, fewer or more components than are shown in FIG. 12 may be included in the system 1200.

The inflatable envelope 1214 may be at least partially filled with a gas. Moreover, a net structure 1260 may be provided such that it is substantially surrounding and constraining the inflatable envelope 1214. The net structure 1260 may comprise, for example, a set of cables or straps in any of a number of different suitable arrangements. For example, the net structure 1260 might be associated with a plurality of spiral structures, a double helix, and/or a series of lateral structures substantially parallel to the horizontal axis 1202. In some cases, the vanes 1216 may be coupled directly to the net structure 1260.

According to some embodiments, a rotation associated with the turbine 1210 is converted into electrical energy. This conversion might be performed, for example, an airborne power transfer apparatus to transfer rotational energy associated with the rotation about the axis and one or more electrical generators airborne with the body to convert the transferred energy into electrical energy. The power transfer apparatus might include, for example, a rigid power transfer ring located substantially at a side of the horizontal axis 1202 (e.g., attached to or proximate to the end plates 1220). The power transfer apparatus might include, for example, a power transfer track, a power transfer wheel, a power transfer pulley, a belt, a chain, and/or a friction drive. According to some embodiments, the power transfer apparatus includes a number of gears (e.g., to increase or decrease a rotational speed associated with the turbine 1210). The power transfer apparatus may, for example, transfer torque from the sides of the turbine 1200 into electrical power (e.g., 10 to 25 kW) and may be fasted below the center of gravity of the turbine 1200.

Figure 13:
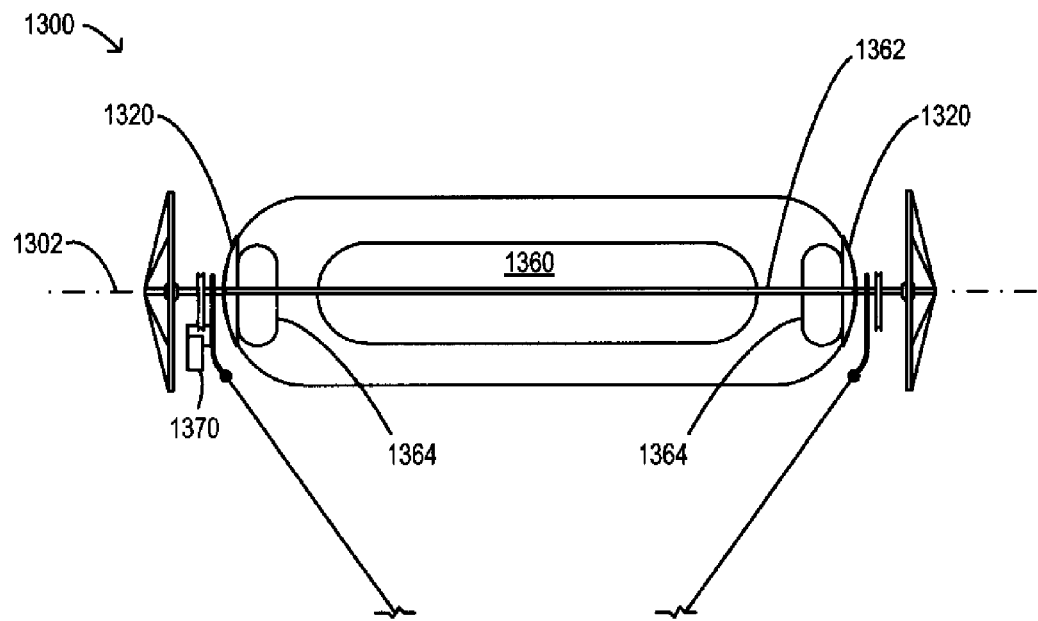
FIG. 13 is frontal cross-sectional view of a wind turbine according to some embodiments.

Note that the use of the net structure 1260 may allow, in some embodiments, for the inflatable envelope 1214 to be super-pressurized with the gas (e.g., a gas that provides a lifting force for the turbine 1210). That is, the net structure 1260 may act to constrain and/or shape the envelope 1214. According to some embodiments, the envelope 1214 may further be shaped by one or more balloonets located inside. For example, FIG. 13 is frontal cross-sectional view of a wind turbine 1300 according to some embodiments. Note that for clarity the vanes associated with the turbine 1300 are not included in the illustration.

As illustrated in FIG. 13, the turbine 1300 may include one or more structures to adjust the volume associated with the inflatable envelope. For example, an adjustable pair of balloonets 1364, each located at substantially opposite sides of the axis 1302 (e.g., at the end plates 1320), may be provided. Similarly, a center balloonet 1360 could be located within, and substantially near the center of, the inflatable envelope. According to some embodiments, at least one structure may provide expandable tension for the inflatable envelope along the axis 1302. For example, a tension bar 1362 may pull the end plates 1320 toward each other. In this way, the pressure within the balloonets 1360, 1364 and/or the forces associated with the tension bar 1366 may help shape the turbine 1300.

According to some embodiments, the main body envelope of the turbine 1300 contains a first gas while the center balloonet 1360 contains a second gas. For example, the main body envelope of the turbine 1300 might be at least partially filled with helium while the center balloonet 1360 is at least partially filled with hydrogen. Factors to be considered when selecting appropriate cases for the turbine might include cost, flammability, and/or an amount of lift associated with the gas. In some cases, a mixture of gases may be provided for the turbine 1300. Note that rotation associated with the turbine 1300 may, in some cases, help promote uniformity for such a mixture of gases.

According to some embodiments, the turbine further includes a gas producing device 1370. The gas producing device 1370 may, for example, use electricity generated by the turbine 1370 to produce at least some of the gas filling the airborne body (e.g., by producing hydrogen and/or helium).

Figures 14A, 14B:
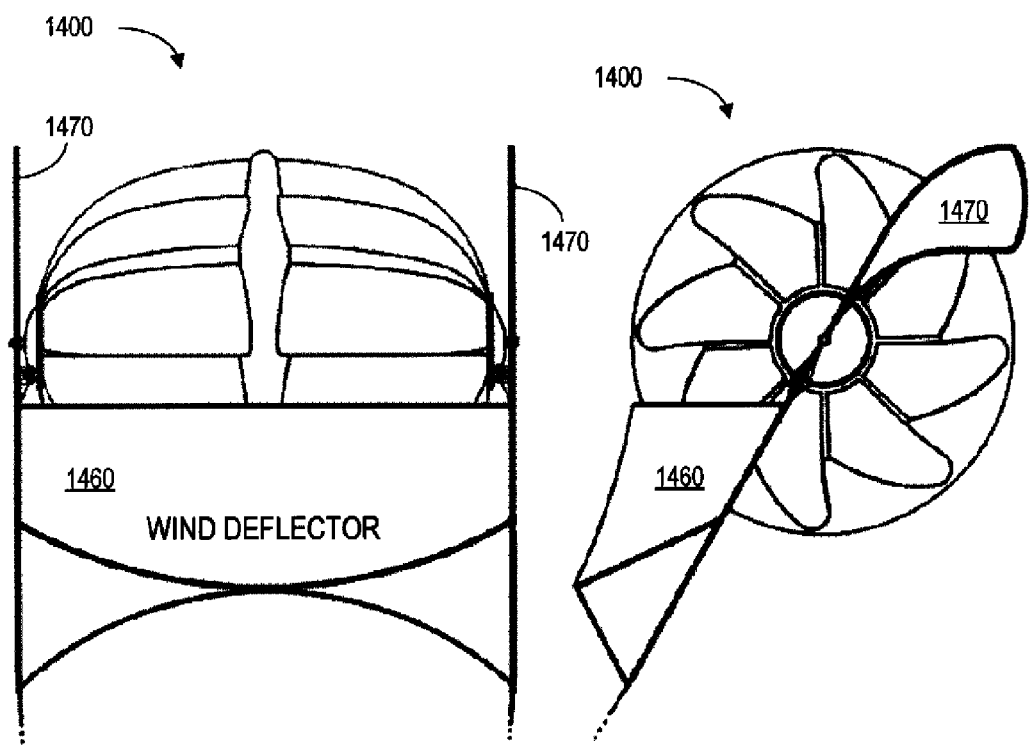
FIGS. 14A and 14B are block diagrams of a wind turbine according to some embodiments.

FIG. 14A is a frontal view and FIG. 14B is an end or side view of a wind turbine 1400 according to some embodiments. According to this embodiment, the turbine 1400 includes at least one wind or air deflector 1460. The deflector 1460 may comprise, for example, a surface airborne with the body to direct at least some of wind force into an area associated with (e.g., defined by) a vane of the turbine 1400. The deflector 1460 might be associated with, for example, one or more passive and/or active surfaces and may include a stabilizer bar, a wing, a kite (e.g., providing lift for the turbine 1400), and/or a rudder. Such a deflector 1460 may increase an amount of rotation and/or lift associated with the turbine 1400. According to some embodiments, the turbine 1400 includes a flow divider surface airborne with the body to direct at least some of the wind force away from an area defined by a vane.

The turbine 1400 may further include a rudder 1470. The rudder 1470 may comprise, for example, a surface airborne with the body to, in response to the wind force, orient the airborne body in a position substantially normal to the wind force. The rudder 1470 might be associated with, for example, one or more passive and/or active surfaces and may include a stabilizer bar, a wing, a kite (e.g., providing lift for the turbine 1400). According to some embodiments, the rudder 1470 is located substantially at one side of the turbine's horizontal axis. In some cases, the rudder 1470 may be substantially disk shaped and may be associated with a height approximately double a height associated with a vane of the turbine 1400. In the example of FIG. 14, a pair of rudders 1470 are provided at opposite side of the horizontal axis. In other embodiments, a rudder may be provided near the center of the horizontal axis. Note that the rudder may include an active surface and may be coupled to a spreader bar and/or a portion that provides lift for the turbine 1400.

Figure 15:
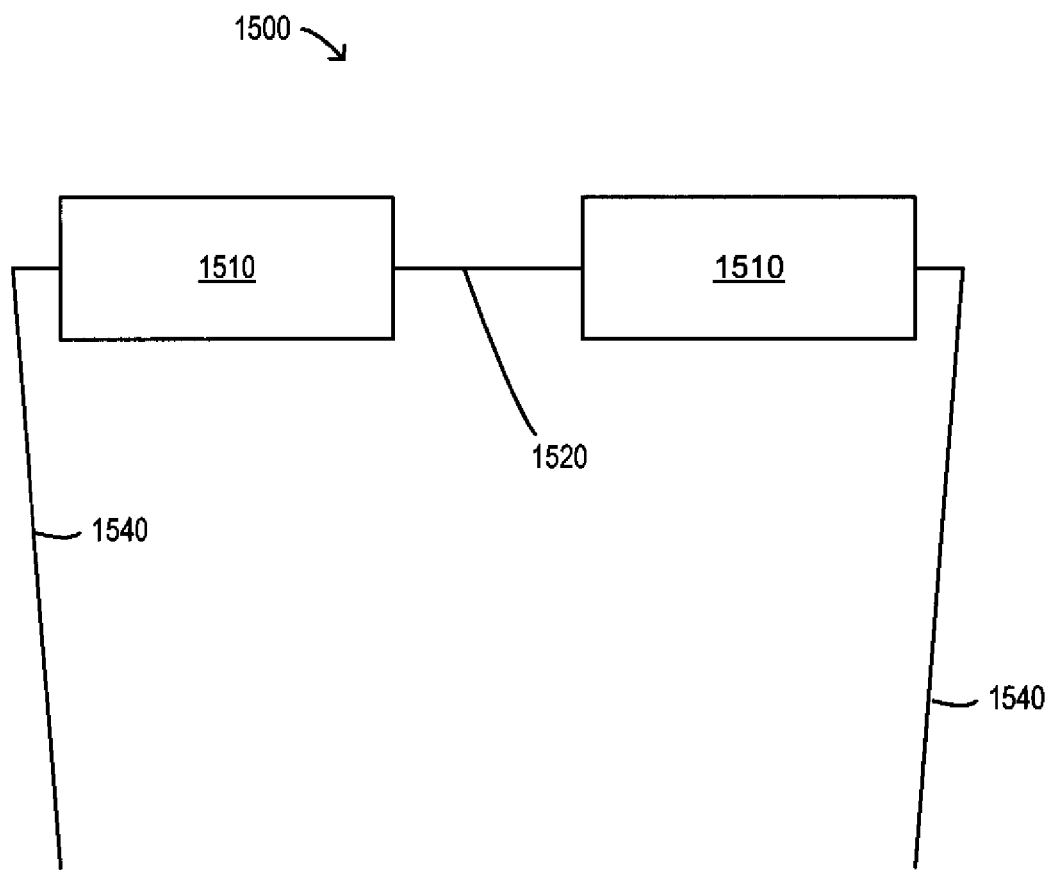
FIG. 15 is a block diagram of a horizontal wind turbine system according to some embodiments.

Note that multiple turbines might be associated with any of the tethered wind turbine systems described herein. For example, FIG. 15 is a block diagram of a "horizontal" wind turbine system 1500 according to some embodiments. In this case, two side-by-side turbine units 1510 are provided. That is, the units 1510 are arranged substantially horizontally. The units 1510 may be attached to each other via a coupler 1520 and/or to a ground point via one or more tethers 1540. Note that electrical generators might be provided at one or both of the units 1510.

Figure 16:
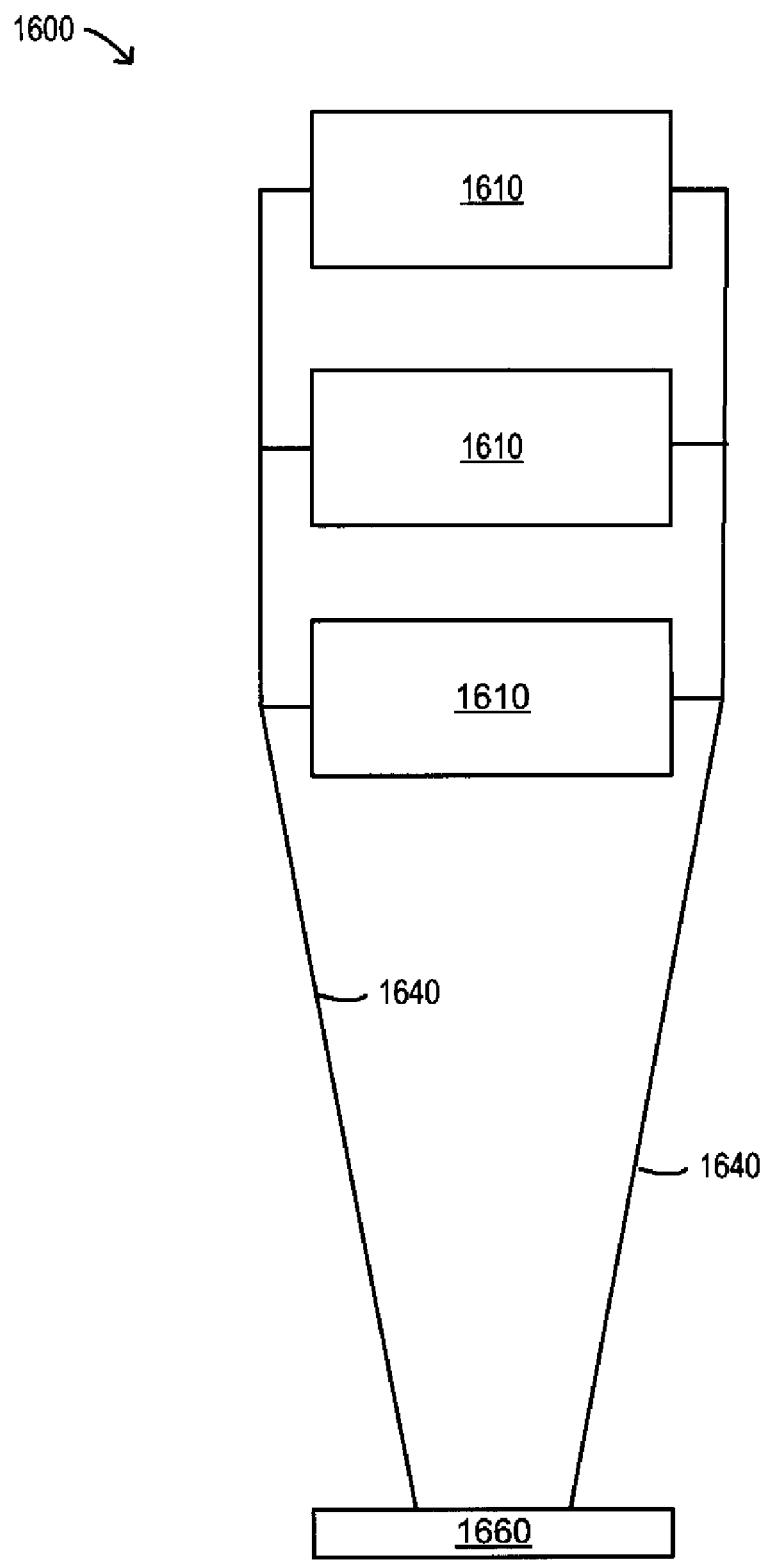
FIG. 16 is a block diagram of a vertical wind turbine system according to some embodiments.

According to another embodiment, wind turbine units may instead be arranged or "stacked" substantially vertically. For example, FIG. 16 is a block diagram of a vertical wind turbine system 1600 having three units 1610 according to some embodiments.

Figure 17:
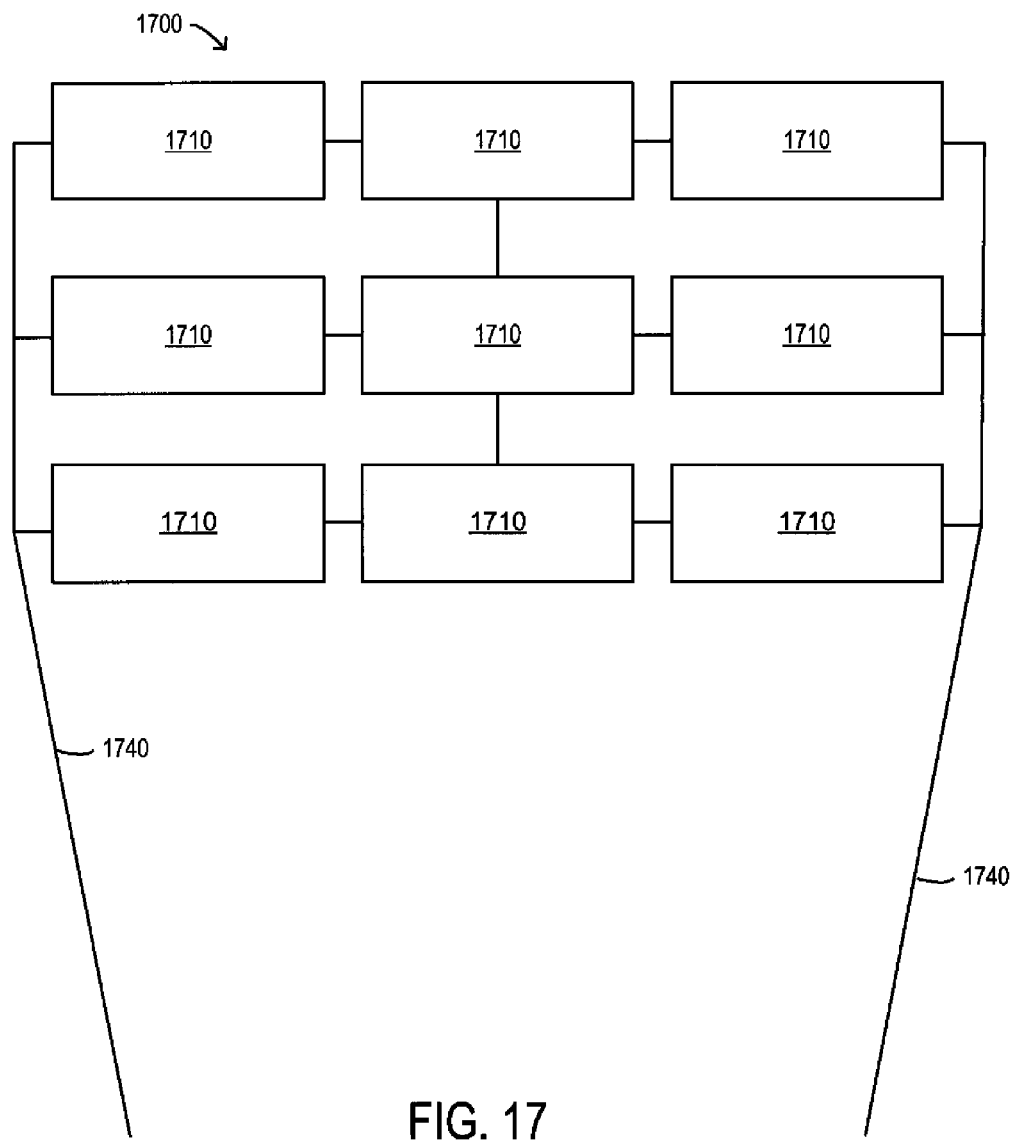
FIG. 17 is a block diagram of a wind turbine matrix system according to some embodiments.

Moreover, according to this embodiment, the units 1610 are connected with tethers 1640 to a rotatable ground station turntable 1660. Such a turntable 1660 may, for example, let the system 1600 be oriented as appropriate in a given wind condition and/or let the system 1600 be pulled down for maintenance. As still another example, FIG. 17 is a block diagram of a wind turbine system 1700 wherein a matrix of airborne units 1710 are attached to a ground point via one or more tethers 1740.

Figure 18A:
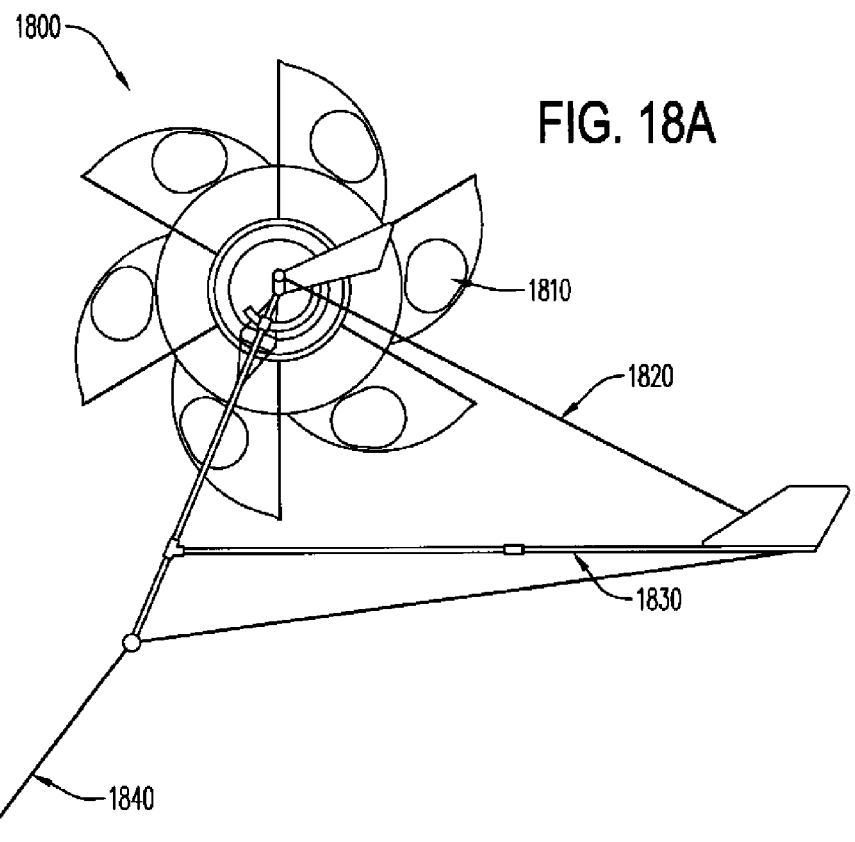
FIG. 18A and FIG. 18B are block diagrams of a system according to still another embodiment.
Figure 18B:
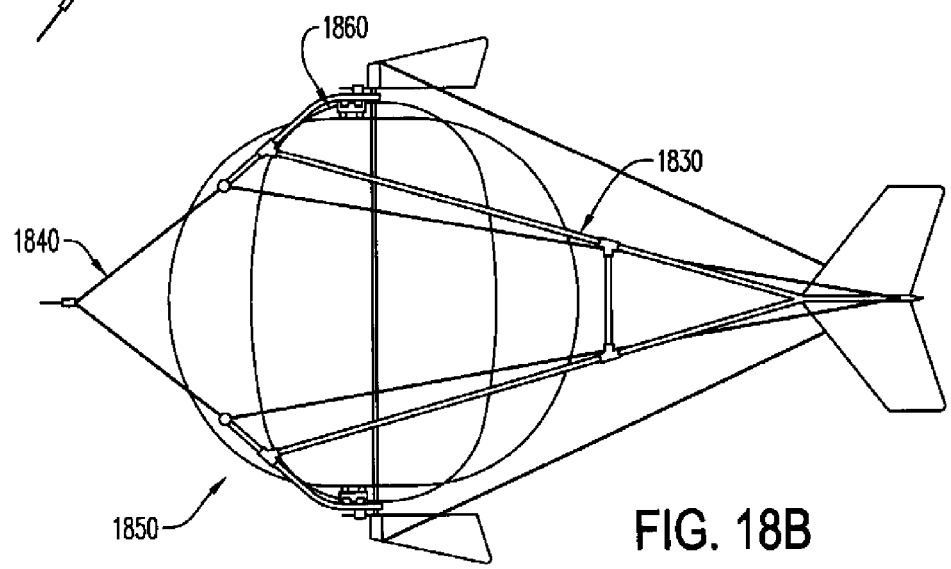
Figures 19A, 19B:
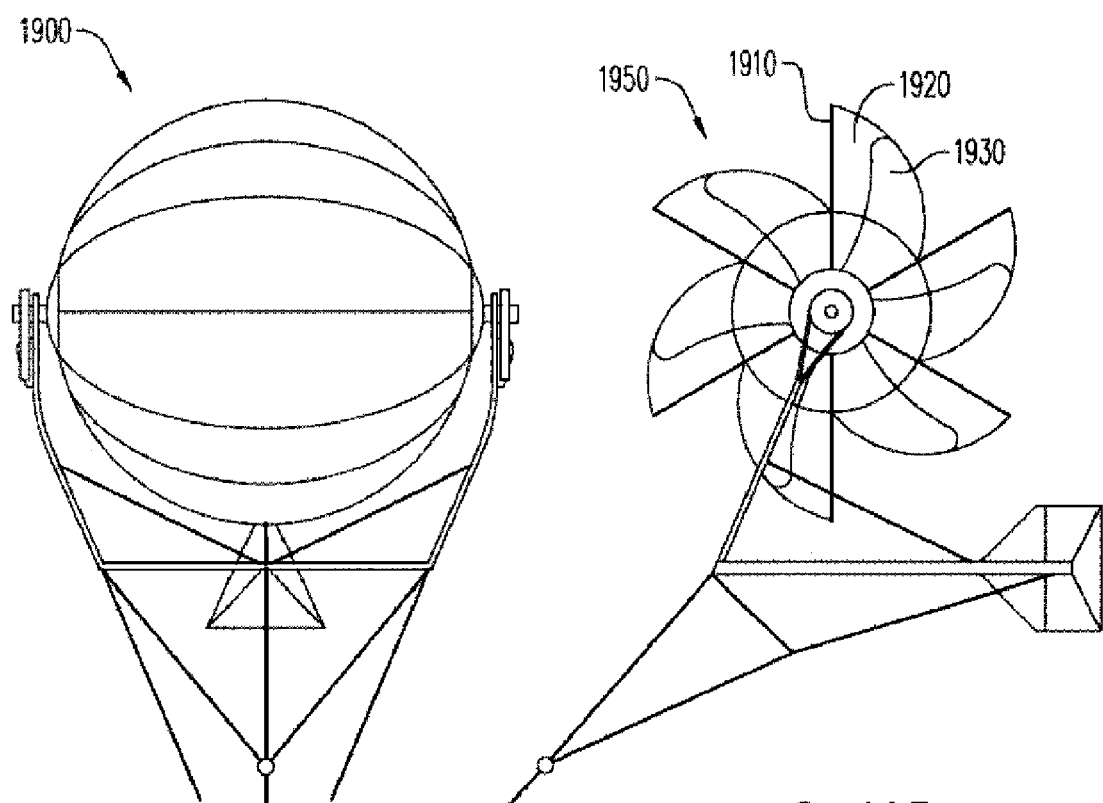
FIG. 19A and FIG. 19B are block diagrams of a system according to yet another embodiment.

Note that although particular examples of wind turbine systems are provided herein, embodiments may be configured in an number of ways. By way of example, FIG. 18A is a side view 1800 and FIG. 18B is a bottom view 1850 of a system according to still another embodiment. In particular, the system includes inflatable tubes 1810 to help maintain the shape of each vane, guy wires 1820 and an A-frame rig 1830 to provide support, and tethers 1840 to anchor the system (e.g., to a ground station), and a generator and track 1860 to produce power based on wind-generated rotation. As still another example, FIG. 19A is a bottom view 1900 and FIG. 19B is a side view 1950 of a large 6-bladed spherical rotor wind turbine system. In this embodiment, each vane is associated with a rigid edge 1910, a wind catcher 1920, and a balloon 1930.

The systems of FIGS. 18 and 19 may provide enhanced stability. According to some embodiments, a central fabric drop fin and a tail boom (e.g., with the two dihedral rudder fins) may further impart stability. Note that such elements may, in some cases, be located behind the center (side axle). Moreover, the blades may be part of a positive lift aspect of the design. According to some embodiments, a "rugby ball" shape may comprise the core balloon and make up less volume than the blades collectively.

The several embodiments described herein are solely for the purpose of illustration. Those skilled in the art will note that various substitutions may be made to those embodiments described herein without departing from the spirit and scope of the present invention. Those skilled in the art will also recognize from this description that other embodiments may be practiced with modifications and alterations limited only by the claims.

What is claimed is:

1. A system, comprising:
   a first unit, including:
      a first airborne body extending horizontally along a first axis between a first point and a second point associate with the first body, wherein the first body is at least partially filled with a gas,
      two or more vanes airborne with the first body such that the vanes, when acted upon by a wind force perpendicular to the first axis, are operable to cause rotation about the first axis,
      one or more tethers coupled to anchor the first body, and
      a first electrical generator airborne with the first body to convert rotational energy produced by the rotation about the first axis into electrical energy; and
   a second unit, including:
      a second airborne body extending horizontally along a second axis between a second point and a second point associate with the second body, wherein the second body is at least partially filled with a gas,
      two or more vanes airborne with the second body such that the vanes, when acted upon by a wind force perpendicular to the second axis, are operable to cause rotation about the second axis,
      one or more tethers coupled to anchor the second body, and
      a second electrical generator airborne with the second body to convert rotational energy produced by the rotation about the second axis into electrical energy; and
   one or more tethers coupled to anchor the first and second units to a ground point.

2. The system of claim 1, wherein the first and second units are aligned substantially vertically.

3. The system of claim 1, wherein the first and second units are aligned substantially horizontally.

4. The system of claim 1, wherein the first and second units are part of matrix of airborne units tethered to the ground point.

5. The system of claim 1, wherein the rotation caused by the wind force comprises rotation of the first airborne body about the axis.

6. The system of claim 5, wherein the rotation of the first airborne body is to generate a lifting force on the first airborne body.

7. The system of claim 1, further comprising a surface airborne with the first body to direct at least some of the wind force into an area defined by a vane.

8. The system of claim 7, wherein the surface comprises a passive surface.

9. The system of claim 7, wherein the surface comprises an active surface.

10. The system of claim 7, wherein the surface is associated with at least one of: (i) a stabilizer bar, (ii) a wing, (iii) a kite, or (iv) a rudder.

11. The system of claim 7, further comprising:
   a flow divider surface airborne with the first body to direct at least some of the wind force away from an area defined by a vane.

12. The system of claim 7, wherein the surface further provides lift for the first airborne body.

13. The system of claim 1, further comprising:
   a surface airborne with the first body to, in response to the wind force, orient the first airborne body in a position substantially normal to the wind force.

14. The system of claim 13, wherein the surface comprises a passive rudder.

15. The system of claim 14, wherein the passive rudder is located substantially at one side of the horizontal axis.

16. The system of claim 14, wherein the passive rudder is substantially disk shaped and is associated with a height approximately double a height associated with a vane.

17. The system of claim 13, wherein surface comprises a pair of passive rudders located substantially at opposite side of the horizontal axis.

18. The system of claim 13, wherein the surface comprises an active surface.

19. The system of claim 13, wherein the surface is coupled to at least one of: (i) a spreader bar, or (ii) a portion that provides lift for the airborne body.

20. The system of claim 13, wherein the ground point comprises a rotatable ground station turntable and the electrical energy is to be transmitted via a path defined by the tethers coupled to the ground station turntable.

* * * * *